(12) United States Patent
Wang et al.

(10) Patent No.: US 11,140,071 B2
(45) Date of Patent: Oct. 5, 2021

(54) MULTIPATH DATA TRANSMISSION METHOD AND DEVICE

(71) Applicant: Huawei Technologies Co., Ltd., Shenzhen (CN)

(72) Inventors: Shujun Wang, Shenzhen (CN); Fanzi Meng, Shenzhen (CN); Dong Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 127 days.

(21) Appl. No.: 16/482,657

(22) PCT Filed: Jul. 28, 2017

(86) PCT No.: PCT/CN2017/094792
§ 371 (c)(1),
(2) Date: Jul. 31, 2019

(87) PCT Pub. No.: WO2018/090666
PCT Pub. Date: May 24, 2018

(65) Prior Publication Data
US 2019/0363974 A1 Nov. 28, 2019

(30) Foreign Application Priority Data

Nov. 17, 2016 (CN) .......................... 201611014002.1

(51) Int. Cl.
*H04L 12/28* (2006.01)
*H04L 12/707* (2013.01)
(Continued)

(52) U.S. Cl.
CPC .............. *H04L 45/24* (2013.01); *H04L 12/66* (2013.01); *H04L 61/2007* (2013.01); *H04L 67/28* (2013.01); *H04L 69/326* (2013.01)

(58) Field of Classification Search
CPC ..... H04L 12/66; H04L 45/24; H04L 61/2007; H04L 69/326; H04L 67/28
See application file for complete search history.

(56) References Cited

U.S. PATENT DOCUMENTS

| 2012/0093150 A1 | 4/2012 | Kini |
| 2012/0099601 A1 | 4/2012 | Haddad et al. |

(Continued)

FOREIGN PATENT DOCUMENTS

| CN | 103168456 A | 6/2013 |
| CN | 103313232 A | 9/2013 |

(Continued)

OTHER PUBLICATIONS

"3rd Generation Partnership Project;Technical Specification Group Core Network and Terminals; Interface between the Control Plane and the User Plane of EPC Nodes; Stage 3 (Release 14)," 3GPP TS 29.244 V0.2.0, pp. 1-26, 3rd Generation Partnership Project, Valbonne, France (Oct. 2016).

(Continued)

*Primary Examiner* — Elisabeth Benoit Magloire
(74) *Attorney, Agent, or Firm* — Leydig, Voit & Mayer, Ltd.

(57) ABSTRACT

A multipath data transmission method and device are provided, where a multipath proxy client and a multipath proxy gateway establish at least two multipath data subflows based on a first internet protocol (IP) address, and perform multipath data subflow data transmission. Based on the first IP address for establishing the at least two multipath data subflows between the multipath proxy client and the multipath proxy gateway, the multipath proxy gateway establishes a TCP connection to and performs TCP-based data transmission with an application server to be accessed by the multipath proxy client. MPTCP-based multipath data transmission based on IP address information of the multipath (Continued)

proxy client is implemented through proxy of the multipath proxy client and the multipath proxy gateway.

19 Claims, 13 Drawing Sheets

(51) Int. Cl.
    *H04L 12/66*     (2006.01)
    *H04L 29/12*     (2006.01)
    *H04L 29/08*     (2006.01)

(56) References Cited

U.S. PATENT DOCUMENTS

| | | | |
|---|---|---|---|
| 2015/0312383 | A1 | 10/2015 | Roeland et al. |
| 2016/0037428 | A1* | 2/2016 | Kanugovi ............... H04L 69/16 370/329 |
| 2017/0054631 | A1* | 2/2017 | Horn .................... H04L 65/1069 |
| 2017/0118787 | A1* | 4/2017 | Kekki ................... H04L 69/163 |
| 2017/0324680 | A1 | 11/2017 | Tu et al. |
| 2017/0339727 | A1* | 11/2017 | Barrett ................... H04L 69/14 |
| 2018/0103123 | A1* | 4/2018 | Skog ...................... H04L 69/14 |
| 2018/0248714 | A1* | 8/2018 | Milescu ................. H04L 45/24 |

FOREIGN PATENT DOCUMENTS

| | | |
|---|---|---|
| CN | 104581816 A | 4/2015 |
| CN | 104581892 A | 4/2015 |
| CN | 104854837 A | 8/2015 |
| CN | 106131233 A | 11/2016 |
| EP | 2869524 A1 | 5/2015 |
| EP | 3085192 B1 | 3/2019 |
| WO | 2012049631 A1 | 5/2013 |
| WO | 2015150875 A1 | 10/2015 |
| WO | 2016030718 A1 | 3/2016 |

OTHER PUBLICATIONS

Deng et al.,"Use-cases and Requirements for MPTCP Proxy in ISP Networks draft-deng-mptcp-proxy-00," MPTCP Working Group, Internet Draft, XP015099305, pp. 1-18, Internet Engineering Task Force, Fremont, California (May 29, 2014).

Wei et al.,"MPTCP proxy mechanisms draft-wei-mptcp-proxy-mechanism-01," Internet Draft, XP015105382, pp. 1-12, Internet Engineering Task Force, Fremont, California (Mar. 9, 2015).

Ford et al., "TCP Extensions for Multipath Operation with Multiple Addresses," Request for Comments: 6824, RFC6824, pp. 1-64, Internet Engineering Task Force (IETF), Fremont, California (Jan. 2013).

* cited by examiner

MULTIPATH DATA TRANSMISSION METHOD AND DEVICE

CROSS-REFERENCE TO RELATED APPLICATIONS

This application is a U.S. national stage application of International Patent Application No. PCT/CN2017/094792, filed on Jul. 28, 2017, which claims priority to Chinese Patent Application No. 201611014002.1, filed on Nov. 17, 2016. The disclosures of the aforementioned applications are hereby incorporated by reference in their entireties.

TECHNICAL FIELD

Embodiments of the present invention relate to the field of communications technologies, and in particular, to a multipath data transmission method and device.

BACKGROUND

As communications technologies develop, multipath transmission control protocol (MPTCP)-based multipath data transmission services emerge accordingly.

At present, to implement an MPTCP-based multipath data transmission service, a terminal mainly establishes an MPTCP link to a proxy server by using agent software such as socks5. Then the proxy server performs transmission control protocol (TCP)-based data transmission with a server that the terminal truly intends to access. However, when performing TCP-based data transmission with the server, the proxy server establishes a TCP connection to the server by using an IP address of the proxy server instead of an internet protocol (IP) address of the terminal. When the proxy server uses its own IP address for data transmission, the IP address of the proxy server is visible to both a user side and a network side, and the proxy server is vulnerable to security attacks with a low level of security. In addition, the network side is unable to obtain the IP address of the terminal, and consequently is unable to implement traffic statistics and control for the terminal.

Therefore, a multipath data transmission method is urgently needed to avoid the foregoing problem.

SUMMARY

Embodiments of the present invention provide a multipath transmission method and device, to implement an MPTCP-based multipath data transmission service based on an IP address of a terminal.

According to a first aspect, a multipath data transmission method is provided. In this transmission method, MPTCP-based multipath data transmission based on IP address information of a multipath proxy client is implemented through proxy of a multipath proxy client and a multipath proxy gateway. At least two multipath data subflows are established and data transmission through the multipath data subflows is performed between the multipath proxy client and the multipath proxy gateway. Based on the IP address information for establishing the at least two multipath data subflows between the multipath proxy client and the multipath proxy gateway, the multipath proxy gateway establishes a TCP connection to and performs TCP-based data transmission with an application server to be accessed by the multipath proxy client.

The multipath proxy client may be an MPTCP application installed on a terminal, and the IP address information of the multipath proxy client may be construed as IP address information of the terminal. Therefore, an MPTCP-based multipath data transmission service based on an IP address of the terminal is implemented. In addition, TCP-based transmission between the multipath proxy gateway and the application server is implemented without using an IP address of the multipath proxy gateway, thereby improving security of the multipath proxy gateway. The application server can obtain the IP address of the multipath proxy client based on an MPTCP connection establishment request, which facilitates traffic statistics and control for the multipath proxy client.

In a possible design, the multipath proxy gateway may establish, based on a first IP address, a TCP connection to and perform TCP-based data transmission with the application server to be accessed by the multipath proxy client, where the first IP address is an IP address for establishing at least two multipath data subflows between the multipath proxy client and the multipath proxy gateway.

In another possible design, the multipath proxy gateway may allocate a second IP address to the multipath proxy client based on the first IP address, and establish, based on the second IP address, the TCP connection to the application server to be accessed by the multipath proxy client. The second IP address is in a mapping relationship with the first IP address, and is used to indicate that multipath data transmission is to be performed. The application server uses the second IP address as a destination address for sending data to the multipath proxy gateway. The multipath proxy gateway establishes multipath data subflows to and performs MPTCP-based data transmission with the multipath proxy client by using the first IP address. The multipath proxy client may determine, based on the mapping relationship, that the data with the destination address being the second IP address needs to be received. In this way, IP layer data can be directly routed from the application server to the multipath proxy gateway, and the multipath proxy client can perform fast addressing, thereby implementing fast MPTCP-based data transmission.

In still another possible design, the multipath proxy client sends an IP address of the application server to be accessed by the multipath proxy client to the multipath proxy gateway, and the multipath proxy gateway obtains the IP address of the application server to be accessed by the multipath proxy client, and establishes the TCP connection to and performs TCP-based data transmission with the application server based on the IP address of the application server and the IP address information for establishing the at least two multipath data subflows between the multipath proxy client and the multipath proxy gateway.

In still another possible design, the multipath proxy gateway may allocate, to the multipath proxy client based on the first IP address, a port dedicated to multipath data transmission, to accelerate MPTCP-based data transmission. The multipath proxy client determines the port dedicated to multipath data transmission, obtains the IP address of the multipath proxy gateway, establishes, by using the port and based on the first IP address and the IP address of the multipath proxy gateway, at least two multipath data subflows to the multipath proxy gateway, and performs data transmission through the multipath data subflows.

In still another possible design, if the multipath proxy gateway and the multipath proxy client determine that no data is transmitted in any of the established at least two multipath data subflows within preset duration, or that the multipath proxy client is already offline in at least two networks in which the at least two multipath data subflows are established, the multipath proxy gateway releases the established at least two multipath data subflows and the TCP connection, and the multipath proxy client releases the established at least two multipath data subflows.

In still another possible design, when determining that the multipath proxy client supports a multipath service, the multipath proxy gateway may establish, based on the first IP address, the TCP connection to the application server to be accessed by the multipath proxy client. When determining that the multipath service is supported, the multipath proxy client establishes at least two multipath data subflows to the multipath proxy gateway.

In this embodiment of the present invention, a multipath management device for MPTCP user authentication (whether a multipath proxy client supports a multipath service) and multipath proxy gateway management and allocation may be deployed, to facilitate flexible deployment and management of a plurality of multipath proxy gateways.

The multipath management device may determine a multipath proxy client performing an MPTCP service and the service by using a blacklist/whitelist, for example, by adding a multipath proxy client capable of performing an MPTCP service and the service to a whitelist. Using a mechanism such as a blacklist/whitelist policy by the multipath management device helps implement splitting control and differentiated charging for a terminal service.

The multipath proxy client sends a multipath policy request to the multipath management device, where the multipath policy request includes identification information of the multipath proxy client. The multipath management device receives the multipath policy request sent by the multipath proxy client, determines, based on the identification information of the multipath proxy client, that the multipath proxy client supports a multipath service, and sends a multipath policy request response to the multipath proxy client. The multipath proxy client receives the multipath policy request response fed back by the multipath management device, and determines that the multipath service is supported.

The multipath management device allocates a multipath proxy gateway to the multipath proxy client supporting the multipath service, and sends indication information used to indicate that the multipath proxy gateway is allocated to the multipath proxy client for multipath data transmission. The multipath proxy gateway determines, based on the indication information sent by the multipath management device to indicate that the multipath proxy gateway is allocated to the multipath proxy client for multipath data transmission, that the multipath proxy client supports the multipath service. The multipath proxy client can determine the IP address of the multipath proxy gateway by receiving the IP address of the multipath proxy gateway allocated by the multipath management device to the multipath proxy client based on the identification information of the multipath proxy client.

The multipath management device may allocate the multipath proxy gateway to the multipath proxy client based on the identification information of the multipath proxy client in the following manner:

determining, by the multipath management device based on the identification information of the multipath proxy client, access gateways accessed by the multipath proxy client in at least two different networks; and allocating, by the multipath management device based on a correspondence between an access gateway and a multipath proxy gateway or based on an IP address of a multipath proxy gateway sent by the access gateway, a multipath proxy gateway in each of the at least two different networks to the multipath proxy client.

In still another possible design, the multipath management device may interact with the multipath proxy gateway, to obtain information about a second IP address and a port that are allocated by the multipath proxy gateway to the multipath proxy client and that are dedicated to establishing a multipath data subflow, and send, to the multipath proxy client, the information about the second IP address and the port that are dedicated to establishing a multipath data subflow.

In still another possible design, if the multipath management device determines that no data is transmitted in any of the established at least two multipath data subflows within preset duration, or that the multipath proxy client is already offline in at least two networks in which the at least two multipath data subflows are established, the multipath management device sends first indication information to the multipath proxy client and the multipath proxy gateway, where the first indication information is used to indicate that no data is transmitted in any of the established at least two multipath data subflows within the preset duration, or that the multipath proxy client is already offline in the at least two networks in which the at least two multipath data subflows are established. After receiving the first indication information, the multipath proxy gateway and the multipath proxy client release the at least two multipath data subflows and the TCP connection.

In this embodiment of the present invention, a notification message that no data is transmitted in the multipath data subflows within the preset duration and that the multipath proxy client is already offline in the at least two networks may be pushed by a network element in a communications network to the multipath management device. The network element pushing the notification message is a network element capable of determining whether the multipath proxy client is offline, for example, a PGW or a PCRF in an LTE network. The PGW in the LTE network is preferred in the embodiments of the present invention.

In this embodiment of the present invention, the multipath management device may further query a data transmission status of each of the at least two multipath data subflows and whether the multipath proxy client is offline. If the multipath management device finds that no data is transmitted in any of the at least two multipath data subflows within the preset duration, or that the multipath proxy client is already offline in the at least two networks, a corresponding link resource may be released.

In this embodiment of the present invention, the multipath management device may query, according to a specified period, the data transmission status of each of the at least two multipath data subflows and whether the multipath proxy client is offline. Alternatively, the multipath management device may query, after receiving a notification message that no data is transmitted in a specified quantity of multipath data subflows in the at least two multipath data subflows or that the multipath proxy client is offline in a specified network, a data transmission status of a multipath data subflow not receiving the notification message or whether the multipath proxy client is offline in another unspecified network.

According to a second aspect, a multipath proxy gateway is provided. The multipath proxy gateway has a function of implementing the multipath proxy gateway in the first aspect. The function may be implemented by hardware or may be implemented by hardware executing corresponding software. The hardware or software includes one or more modules corresponding to the foregoing function. The modules may be software and/or hardware.

In a possible design, the multipath proxy gateway includes a transceiver unit and a processing unit. Functions of the transceiver unit and the processing unit may correspond to steps in the method. No more details are described herein.

According to a third aspect, a multipath proxy client is provided. The multipath proxy client has a function of implementing the multipath proxy client in the first aspect. The function may be implemented by hardware or may be implemented by hardware executing corresponding software. The hardware or software includes one or more modules corresponding to the foregoing function. The modules may be software and/or hardware.

In a possible design, the multipath proxy client includes an obtaining unit and a processing unit.

In another possible design, the multipath proxy client further includes a sending unit.

Functions of the obtaining unit, the processing unit, and the sending unit may correspond to steps in the method. No more details are described herein.

According to a fourth aspect, a multipath management device is provided. The multipath management device has a function of implementing the multipath management device in the first aspect. The function may be implemented by hardware or may be implemented by hardware executing corresponding software. The hardware or software includes one or more modules corresponding to the foregoing function. The modules may be software and/or hardware.

In a possible design, the multipath management device includes a communications unit and a processing unit.

Functions of the communications unit and the processing unit may correspond to steps in the method. No more details are described herein.

According to a fifth aspect, a multipath proxy gateway is provided. The multipath proxy gateway includes a processor, a memory, and a transceiver.

The memory is configured to store an instruction, and the processor is configured to execute the instruction stored in the memory to control the transceiver to perform signal receiving and sending. When the processor executes the instruction stored in the memory, the multipath proxy gateway is configured to implement any method of the multipath proxy gateway described in the first aspect.

According to a sixth aspect, a multipath proxy client is provided. The multipath proxy client includes a processor, a memory, a receiver, and a transmitter.

The memory is configured to store an instruction, and the processor is configured to execute the instruction stored in the memory to control the receiver and the transmitter to perform signal receiving and sending. When the processor executes the instruction stored in the memory, the multipath proxy client is configured to implement any method of the multipath proxy client described in the first aspect.

According to a seventh aspect, a multipath management device is provided. The multipath management device includes a processor, a memory, and a communications interface.

The memory is configured to store an instruction, and the processor is configured to execute the instruction stored in the memory, and communicate with another network element device through the communications interface. When the processor executes the instruction stored in the memory, the multipath management device is configured to implement any method of the multipath management device described in the first aspect.

According to an eighth aspect, a computer storage medium is provided. The computer storage medium is configured to store some instructions. When these instructions are executed, any method of the multipath proxy gateway, the multipath proxy client, or the multipath management device may be implemented.

According to a ninth aspect, a communications system is provided, including a multipath proxy gateway, a multipath proxy client, and a multipath management device. The multipath proxy gateway is the multipath proxy gateway in the second aspect or the fifth aspect, the multipath proxy client is the multipath proxy client in the third aspect or the sixth aspect, and the multipath management device is the multipath management device in the fourth aspect or the seventh aspect.

In the multipath data transmission method provided in the embodiments of the present invention, the multipath proxy client and the multipath proxy gateway provide a proxy service for TCP-based data transmission. In addition, TCP-based transmission between the multipath proxy gateway and the application server is implemented without using the IP address of the multipath proxy gateway, thereby improving security of the multipath proxy gateway. The application server can obtain the IP address of the multipath proxy client, which facilitates traffic statistics and control for the multipath proxy client. In addition, using the multipath policy mechanism such as a blacklist/whitelist by the multipath management device helps implement splitting control and differentiated charging for a service.

DESCRIPTION OF EMBODIMENTS

The following describes technical solutions in embodiments of the present invention in detail with reference to the accompanying drawings in the embodiments of the present invention. Apparently, the described embodiments are merely some but not all of the embodiments of the present invention.

Figure 1:
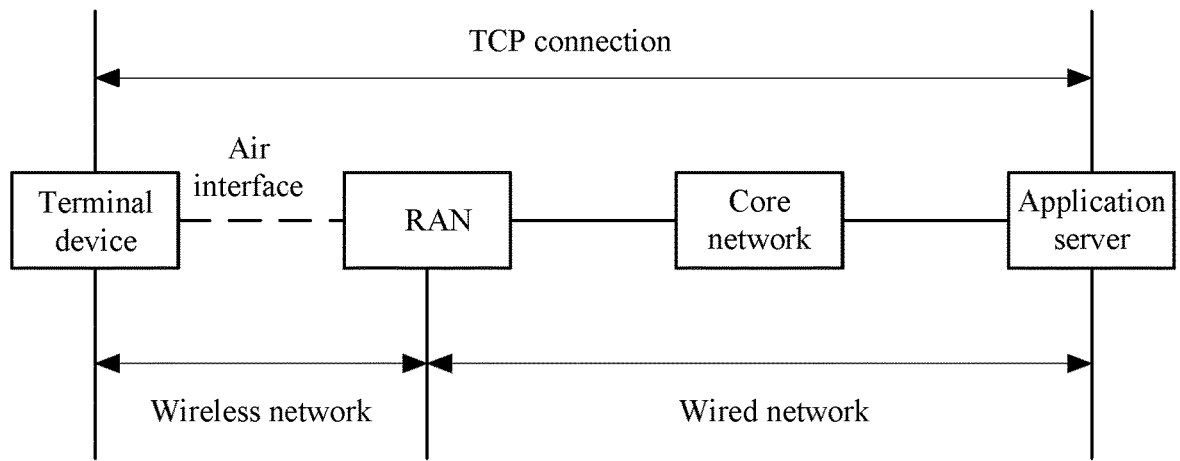
FIG. 1 is a system architecture to which a multipath data transmission method according to an embodiment of the present invention is applied.

A multipath data transmission method provided in the embodiments of the present invention may be applied to data transmission in a wireless communications system, where a data receive end and a data transmit end exchange data through a radio access network (RAN) and a core network. In addition, a TCP connection may be established between the data receive end and the data transmit end for data transmission over the TCP protocol. For example, as shown in FIG. 1, in a wireless communications system, a terminal exchanges data with an application server. The terminal is connected to a RAN through an air interface, and is connected to the application server via a core network. A network between the terminal and the RAN may be referred to as a wireless network, and a network between the RAN and the application server may be referred to as a wired network. A TCP connection is established and data transmission is performed between the application server and the terminal.

Figure 2:
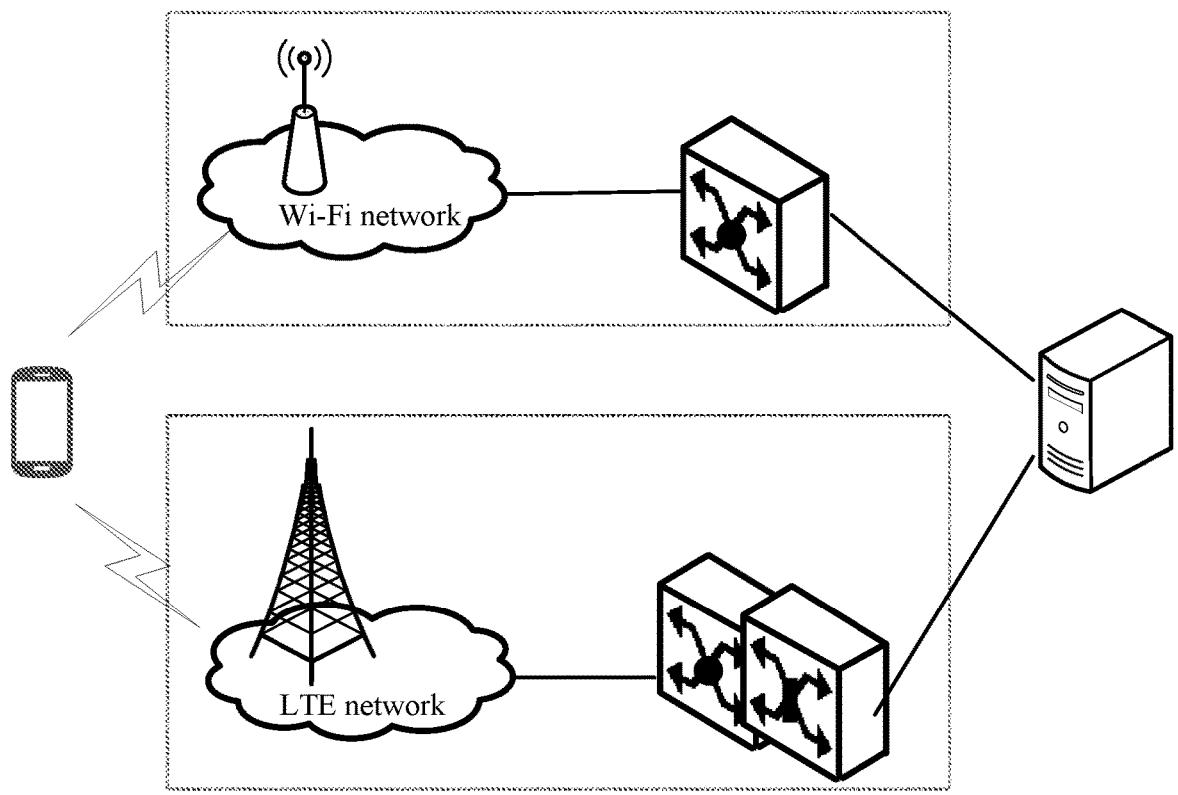
FIG. 2 is an architectural diagram of a data transmission system deployed with a plurality of networks according to an embodiment of the present invention.

As communications technologies develop, a communications system has evolved to a communications architecture in which a plurality of communications networks are deployed together. A terminal may access more than one communications network for communication. For example, in a communications system shown in FIG. 2 in which a wireless fidelity (WIFI) network and a long term evolution (LTE) network are deployed, a terminal may access the Wi-Fi network and perform data transmission with an application server through an evolved packet data gateway (ePDG) or a trusted gateway (TGW). Alternatively, the terminal may access the LTE network and perform data transmission with the application server through a serving gateway (SGW) or a packet data network gateway (PGW).

Figure 3:
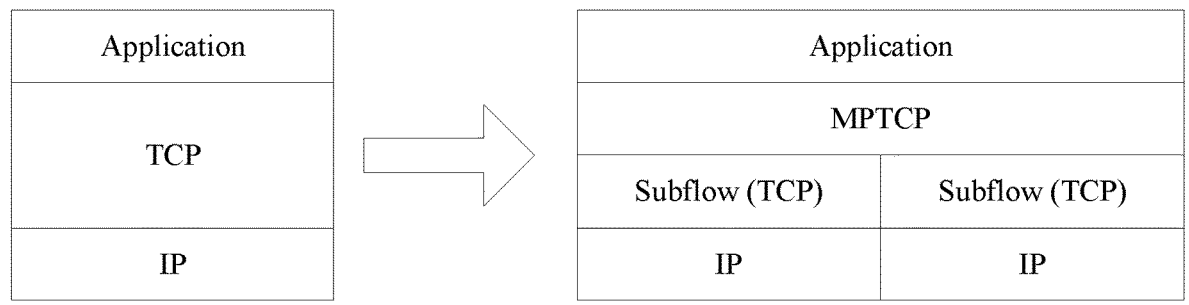
FIG. 3 is a schematic diagram of expanding a TCP protocol stack to an MPTCP protocol stack according to an embodiment of the present invention.

Multi-network deployment drives development of MPTCP multipath data transmission services. At present, the TCP protocol may be extended so that data transmission can be implemented for one service by using multipath network resources, for example, by using a Wi-Fi network resource and an LTE network resource in FIG. 2. FIG. 3 is a schematic diagram of expanding a TCP protocol stack to an MPTCP protocol stack. In the TCP protocol stack, an application layer TCP flow is sent in one TCP flow, whereas in the MPTCP protocol stack, an application layer TCP flow is split into two TCP subflows at an MPTCP layer for separate transmission.

Figure 4A:
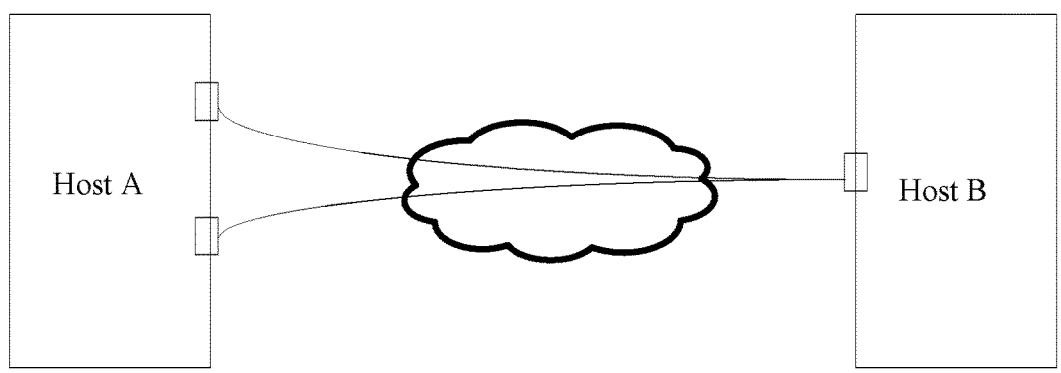
FIG. 4A and FIG. 4B are schematic diagrams of MPTCP implementation processes in RFC 6824.
Figure 4B:
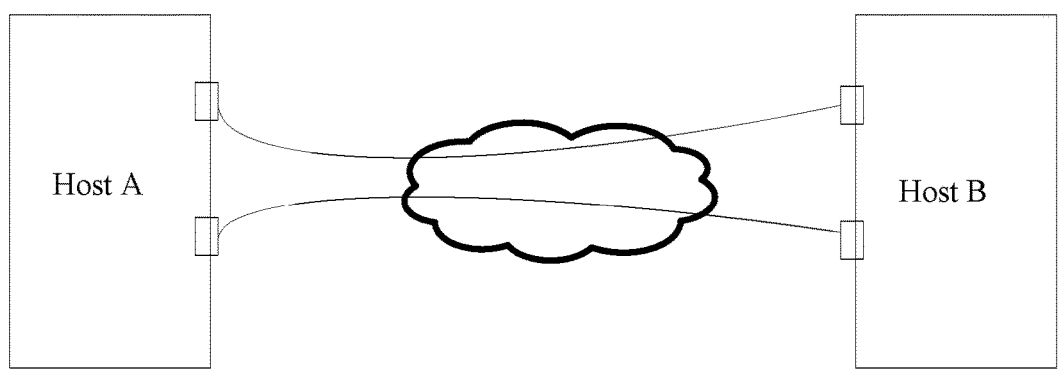

FIG. 4A and FIG. 4B are schematic diagrams of application scenarios of MPTCP in RFC 6824. Between a host A and a host B in FIG. 4A, a TCP flow is split into two TCP subflows at an MPTCP layer of a transmit end for separate transmission, and the two subflows are merged at a receive end and sent to an application layer. Between a host A and a host B in FIG. 4B, a TCP flow is split into two TCP subflows at an MPTCP layer of a transmit end for separate transmission, and the two subflows remain as two separate subflows at a receive end and are sent to an application layer.

However, a terminal and an application server are not highly supportive for the MPTCP protocol stack, and an IP address of the terminal cannot be used for MPTCP-based multipath data transmission between the terminal and the application server. The embodiments of the present invention provide a method for implementing MPTCP-based multipath data transmission between the terminal and the application server based on the IP address of the terminal.

In the embodiments of the present invention, a multipath proxy client (MPTCP client) and a multipath proxy gateway (MPTCP GW) may be introduced to implement MPTCP-based multipath data transmission between the terminal and the application server. At least two multipath data subflows are established and data transmission is performed between the MPTCP client and the MPTCP GW through the multipath data subflows. Between the MPTCP GW and an application server to be accessed by the MPTCP client, a TCP connection is established and TCP-based data transmission is performed based on IP address information for establishing the at least two multipath data subflows between the MPTCP client and the MPTCP GW. MPTCP-based multipath data transmission based on the IP address information of the MPTCP client is implemented through proxy of the MPTCP client and the MPTCP GW.

It should be noted that the terminal in the embodiments of the present invention is a terminal that supports multiple access, where multiple access means being capable of accessing at least two different networks. The terminal may include a variety of wireless communication function-embedded handheld devices, in-vehicle devices, wearable devices, computing devices, or other processing devices connected to a wireless modem, or various forms of user equipment (UE for short), mobile stations (MS), terminal equipment, or the like. A network accessed by the terminal may be a Wi-Fi network, an LTE network, or other wireless communications networks using a variety of radio access technologies, for example, communications networks using access technologies such as code division multiple access, frequency division multiple access, time division multiple access, orthogonal frequency division multiple access, and single carrier frequency division multiple access. In addition, the terminal may also be applied to an evolved LTE system, for example, a 5th generation (5G) system. For ease of description, in the embodiments of the present invention, the following uses an example in which the terminal accesses the Wi-Fi network and the LTE network for description.

The MPTCP client in the embodiments of the present invention may be a network element component newly deployed in the communications network, or may be a function unit newly added to an original network element component. For example, an MPTCP application (APP) may be installed on the terminal as the MPTCP client. In the embodiments of the present invention, description is provided by using an example in which a terminal installed with the MPTCP client serves as the MPTCP client. In other words, the MPTCP client in the following embodiments may be understood as a terminal.

The MPTCP GW in the embodiments of the present invention is a network element component newly deployed in the communications network. A plurality of MPTCP GWs may be deployed in the communications network.

Optionally, in the embodiments of the present invention, a multipath management device may be further introduced to facilitate flexible deployment and management of a plurality of MPTCP GWs. The multipath management device is configured to perform MPTCP user authentication and MPTCP GW management and allocation. For example, the multipath management device may obtain a multipath policy request sent by an MPTCP client, determine a supported multipath service based on the multipath policy request, and allocate an MPTCP GW supporting the multipath service.

The multipath management device in the embodiments of the present invention may be a network element component newly deployed in the communications network, or may be a function unit newly added to an original network element component. For example, the multipath management device may be an original PGW in the communications network, or may be an MPTCP manager newly deployed in the communications network. For ease of description, in the embodiments of the present invention, description is provided by using an example in which a newly deployed MPTCP manager serves as the multipath management device.

It can be understood that in the embodiments of the present invention, no MPTCP manager may be deployed. Instead, the MPTCP GW implements functions of the MPTCP manager such as receiving a multipath policy request and determining that a multipath service is supported.

The following describes in detail the multipath data transmission method in the embodiments of the present invention.

Figure 5:
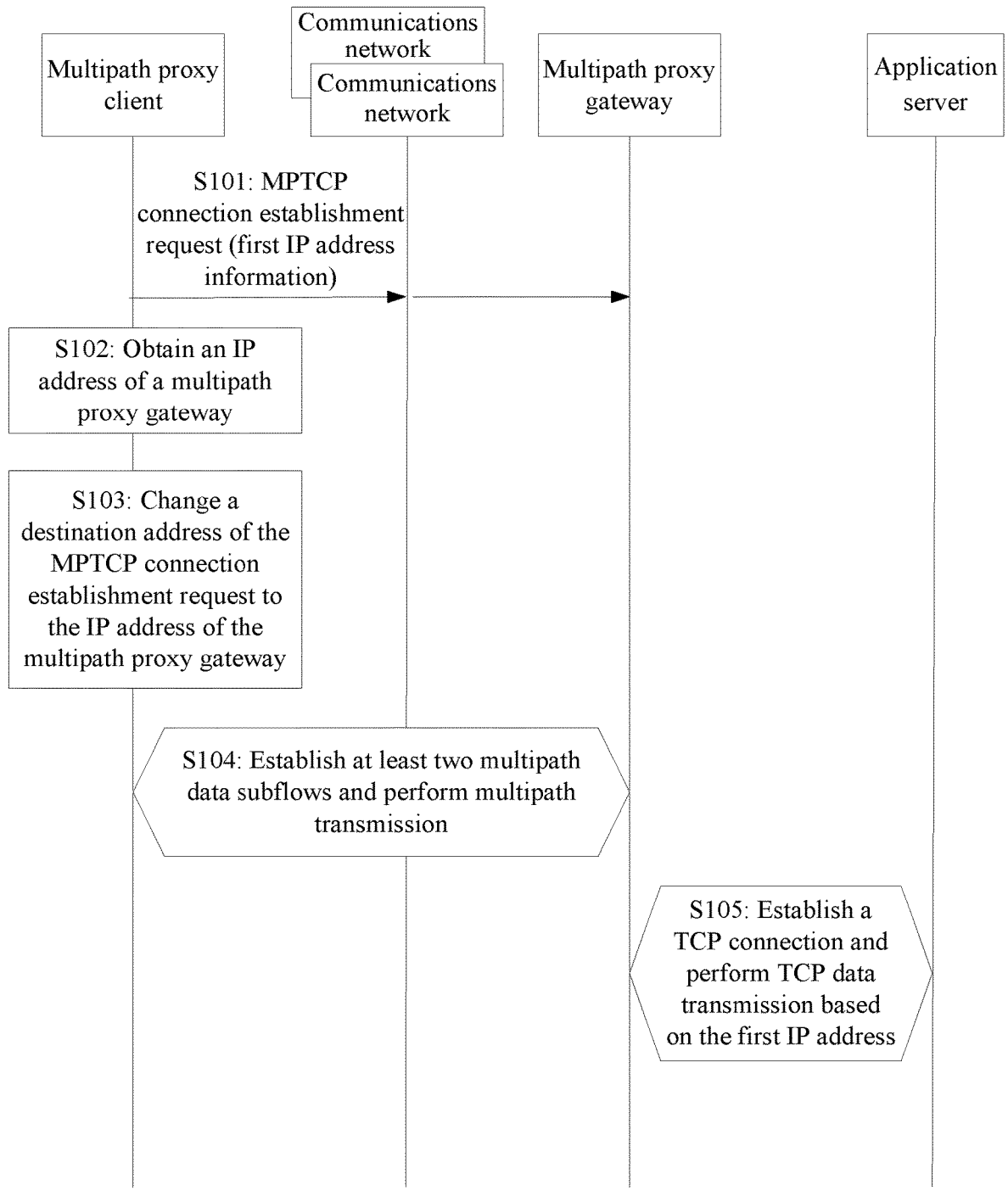
FIG. 5 is an implementation flowchart of a multipath data transmission method according to an embodiment of the present invention.

FIG. 5 is an implementation flowchart of a multipath data transmission method according to an embodiment of the present invention. As shown in FIG. 5, the method includes the following steps.

S101: An MPTCP client accesses at least two different networks, and sends an MPTCP connection establishment request in the at least two different networks.

In this embodiment of the present invention, the MPTCP client sends the MPTCP connection establishment request in the at least two different networks, to request to perform data transmission through multipath data subflows. IP address information of the MPTCP client included in the MPTCP connection establishment request may be used for establishing at least two multipath data subflows between the MPTCP client and an MPTCP GW. In this embodiment of the present invention, the IP address information of the MPTCP client may be an IP address, obtained after the MPTCP client accesses the networks, for the MPTCP client to perform communication in the at least two different networks.

For ease of description, the IP address used for establishing at least two multipath data subflows between the MPTCP client and the MPTCP GW is referred to as a first IP address in this embodiment of the present invention.

Figure 6:
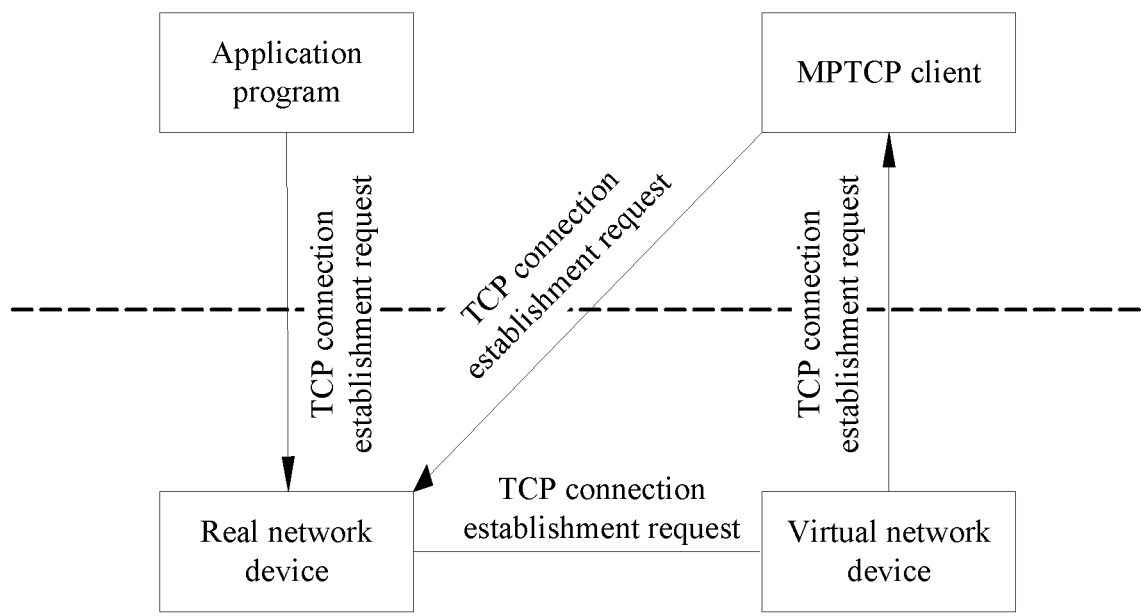
FIG. 6 is a schematic diagram of a principle for an MPTCP client to obtain an MPTCP connection establishment request sent by a terminal according to an embodiment of the present invention.

In this embodiment of the present invention, the MPTCP client may send the MPTCP connection establishment request according to a data processing principle of a virtual private network (VPN) service framework of a virtual network device (for example, a virtual network adapter) shown in FIG. 6. In FIG. 6, an application program invokes a socket to send a corresponding data packet (an MPTCP connection establishment request) to a real network device (an application server). A VPN service system forwards all data packets to a virtual network device through network address translation (NAT) by using an IP information packet filtering tool (iptables). The MPTCP client can obtain all the IP data packets forwarded to the virtual network device by reading data of the virtual network device, process the obtained IP data packets, and send the processed IP data packets by using the real network device (the application server).

S102: The MPTCP client obtains an IP address of the MPTCP GW.

The MPTCP client can obtain the IP address of the MPTCP GW from a domain name server (DNS) through query.

S103: The MPTCP client changes a destination address of the MPTCP connection establishment request to the IP address of the MPTCP GW, and forwards the MPTCP connection establishment request to the MPTCP GW.

In this embodiment of the present invention, the destination address of the MPTCP connection establishment request may be an IP address of an application server to be accessed by the MPTCP client. The application server to be accessed by the MPTCP client is an application server that establishes a TCP connection to and performs TCP-based data transmission with a terminal acting as the MPTCP client.

S104: The MPTCP client establishes at least two multipath data subflows to the MPTCP GW, and performs data transmission through the established multipath data subflows.

In this embodiment of the present invention, the MPTCP client may establish at least two multipath data subflows to the MPTCP GW based on the first IP address information of the MPTCP client included in the MPTCP connection establishment request and address information of the MPTCP GW.

S105: The MPTCP GW establishes, based on the first IP address information of the MPTCP client, a TCP connection to the application server to be accessed by the MPTCP client, and performs TCP-based data transmission through the TCP connection.

In this embodiment of the present invention, the MPTCP client sends the MPTCP connection establishment request in the at least two different networks, establishes multipath data subflows between the MPTCP client and the MPTCP GW based on the IP address information of the MPTCP client included in the MPTCP connection establishment request, and performs data transmission through the multipath data subflows. The MPTCP GW establishes the TCP connection to and performs TCP-based data transmission with the application server based on the IP address information of the MPTCP client. The MPTCP client and the MPTCP GW provide a proxy service for the MPTCP client to perform TCP-based data transmission, and TCP-based transmission established between the MPTCP GW and the application server is implemented without using the IP address of the MPTCP GW, thereby improving security of the MPTCP GW. In addition, the application server can obtain the IP address of the MPTCP client based on the MPTCP connection establishment request, which facilitates traffic statistics and control for the MPTCP client.

Optionally, in this embodiment of the present invention, the MPTCP client can interact with the MPTCP manager, to implement MPTCP proxy. The MPTCP manager is configured to perform MPTCP user authentication, for example, configured to determine an MPTCP client performing an MPTCP service and the service. The MPTCP manager may determine an MPTCP client performing an MPTCP service and the service by using a blacklist/whitelist, for example, by adding an MPTCP client capable of performing an MPTCP service and the service to a whitelist. Using a mechanism such as a blacklist/whitelist policy by the MPTCP manager helps implement splitting control and differentiated charging for a terminal service. The MPTCP manager is further configured to perform MPTCP GW management and allocation. The MPTCP manager can maintain a plurality of MPTCP GWs. When the MPTCP client needs to perform MPTCP-based multipath data transmission, the MPTCP client sends a multipath policy request to the MPTCP manager, where the multipath policy request includes identification information of the MPTCP client. The MPTCP manager determines, based on the identification information of the MPTCP client included in the multipath policy request, that the MPTCP client supports a multipath service, and allocates a multipath proxy gateway supporting the multipath service to the MPTCP client.

In this embodiment of the present invention, when a plurality of MPTCP GWs are deployed in the communications network, the MPTCP client needs to select an MPTCP GW, and establish multipath data subflows to the selected MPTCP GW.

In this embodiment of the present invention, the following describes, with reference to actual application, a process of selecting an MPTCP GW by the MPTCP client and a process of establishing multipath data subflows to the MPTCP GW by the MPTCP client.

In this embodiment of the present invention, the following provides description by using an example in which the MPTCP client accesses a Wi-Fi network and an LTE network and an MPTCP manager allocates an MPTCP GW.

Figure 7:
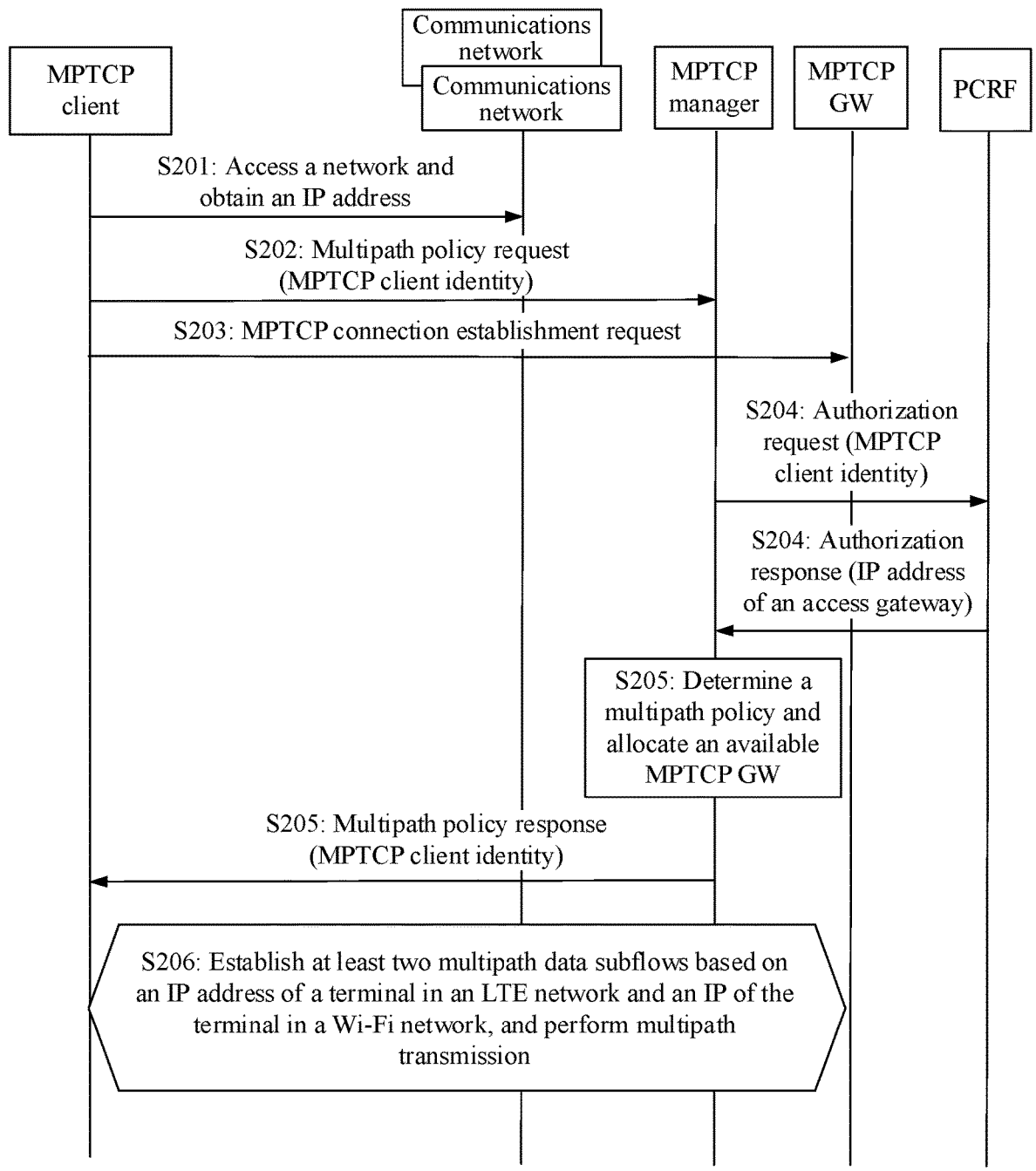
FIG. 7 is an implementation flowchart for an MPTCP client to establish a multipath data subflow to an MPTCP GW according to an embodiment of the present invention.

FIG. 7 is an implementation flowchart for an MPTCP client to establish a multipath data subflow to an MPTCP GW according to an embodiment of the present invention.

S201: An MPTCP client supporting multiple access normally accesses an LTE network and a Wi-Fi network, and obtains IP addresses of the MPTCP client in the LTE network and the Wi-Fi network. That the MPTCP client accesses the LTE network is used as an example in FIG. 7.

S202: The MPTCP client initiates a multipath policy request, where the multipath policy request includes identification information of the MPTCP client. The identification information of the MPTCP client may be an access point name (APN) or an international mobile subscriber identity (IMSI). The multipath policy request further includes the IP addresses of the MPTCP client in the LTE network and the Wi-Fi network.

In this embodiment of the present invention, the MPTCP client may send a query request for querying an IP address of an MPTCP manager to a DNS, and the DNS responds to the query request and feeds back the IP address of the MPTCP manager.

The MPTCP client initiates the multipath policy request to the MPTCP manager. The MPTCP manager determines, based on the multipath policy request, whether the MPTCP client initiating the multipath policy request can perform an MPTCP service. For example, after the MPTCP manager determines that the MPTCP client is online in the LTE network by querying a policy and charging rules function (PCRF) and obtains a multipath policy for performing the MPTCP service, and determines that the MPTCP client is online in the Wi-Fi network by querying authentication, authorization, and accounting (AAA) server and obtains a multipath policy for performing the MPTCP service, the MPTCP manager determines that the MPTCP client can perform the MPTCP service, and sends a multipath policy request response message to the MPTCP client. In this embodiment of the present invention, if the MPTCP manager determines that the MPTCP client is unable to perform the MPTCP service, the MPTCP client can perform data transmission with the application server by using a conventional TCP-based data transmission method.

S203: The MPTCP client receives the multipath policy request response message, determines to support the MPTCP service, and sends an MPTCP connection establishment request. The MPTCP client interacts with the MPTCP manager to implement MPTCP proxy.

S204: The MPTCP manager obtains addresses of access gateways of at least two different networks that the MPTCP client accesses, for example, an IP address of a PGW of the LTE network that the MPTCP client accesses.

In this embodiment of the present invention, the MPTCP manager may send an access authorization request to the AAA server, a home subscriber server (HSS), or the PCRF based on the identification information of the MPTCP client included in the multipath policy request, obtain information about mapping between an MPTCP client identity and a PGW based on an authorization response, and determine the addresses of the access gateways of the at least two different networks that the MPTCP client accesses.

S205: The MPTCP manager determines a multipath policy and allocates, based on the addresses of the access gateways, an available MPTCP GW to the MPTCP client that can perform the MPTCP service.

Optionally, the MPTCP manager may statically configure a multipath policy, or may obtain a dynamically configured multipath policy from another network device such as the AAA server or the PCRF. The multipath policy includes the MPTCP client supporting multipath data transmission, a service, and the like.

In this embodiment of the present invention, the MPTCP manager can allocate an MPTCP GW to the MPTCP client based on a correspondence between an MPTCP GW and a PGW. When a plurality of MPTCP GWs are deployed, priorities may be set for different MPTCP GWs, and the MPTCP manager allocates an MPTCP GW to the MPTCP client according to the priorities. In this embodiment of the present invention, PGWs of at least two different networks that the MPTCP client accesses may alternatively send the address of the MPTCP GW to the MPTCP manager.

Preferably, the MPTCP manager may allocate an MPTCP GW that shares one IP address with the PGW and is in one network segment with the PGW to the MPTCP client.

S206: The MPTCP client obtains an IP address of the MPTCP GW, and establishes a multipath data subflow to the MPTCP GW based on an IP address of the MPTCP client in the LTE network and an IP address of the MPTCP client in the Wi-Fi network (the first IP address) and the IP address of the MPTCP GW, and performs data transmission through the established multipath data subflow.

Specifically, the MPTCP client may determine, based on the multipath policy, whether a proxy for MPTCP-based multipath data transmission is started. For example, if the MPTCP client identity included in the multipath policy request is an authorized MPTCP client identity, after the MPTCP client corresponding to the MPTCP client identity sends the MPTCP connection establishment request, the MPTCP client changes a destination address of the MPTCP connection establishment request to an address of the MPTCP GW, and forwards the MPTCP connection establishment request to the MPTCP GW.

Optionally, in this embodiment of the present invention, to reduce changes to a communication process in an existing network, and accelerate MPTCP-based data transmission, the MPTCP GW may allocate, to the MPTCP client, a port dedicated to establishing a multipath data subflow, and the MPTCP client may establish at least two multipath data subflows to the MPTCP GW based on the port allocated by the MPTCP GW, the first IP address, and the IP address of the MPTCP GW.

Optionally, in this embodiment of the present invention, the MPTCP GW may allocate, based on the IP address of the MPTCP client in the LTE network and the IP address of the MPTCP client in the Wi-Fi network (the first IP address), a second IP address in a mapping relationship with the first IP address to the MPTCP client, where the second IP address is used to indicate that multipath data transmission is to be performed.

Optionally, the MPTCP client may record a mapping relationship between an IP address and an MPTCP client in each multipath data subflow, to maintain the MPTCP connection establishment request sent by the MPTCP client. The IP address in the mapping relationship includes IP addresses of the MPTCP client in the LTE network and the Wi-Fi network (the first IP address), and the second IP address that is allocated by the MPTCP GW to the MPTCP client and that is dedicated to establishing the multipath data subflows. The MPTCP GW establishes, by using the second IP address, a TCP connection to and performs TCP data transmission with an application server to be accessed by the MPTCP client, and the application server uses the second IP address as a destination address for sending data to the MPTCP GW. The MPTCP GW establishes multipath data subflows to and performs MPTCP-based data transmission with the MPTCP client by using the first IP address. The MPTCP client may determine, based on the mapping relationship, that the data with the destination address being the second IP address needs to be received. In this way, IP layer data can be directly routed from the application server to the MPTCP GW, and the MPTCP client can perform fast addressing, thereby implementing fast MPTCP-based data transmission.

Figure 8:
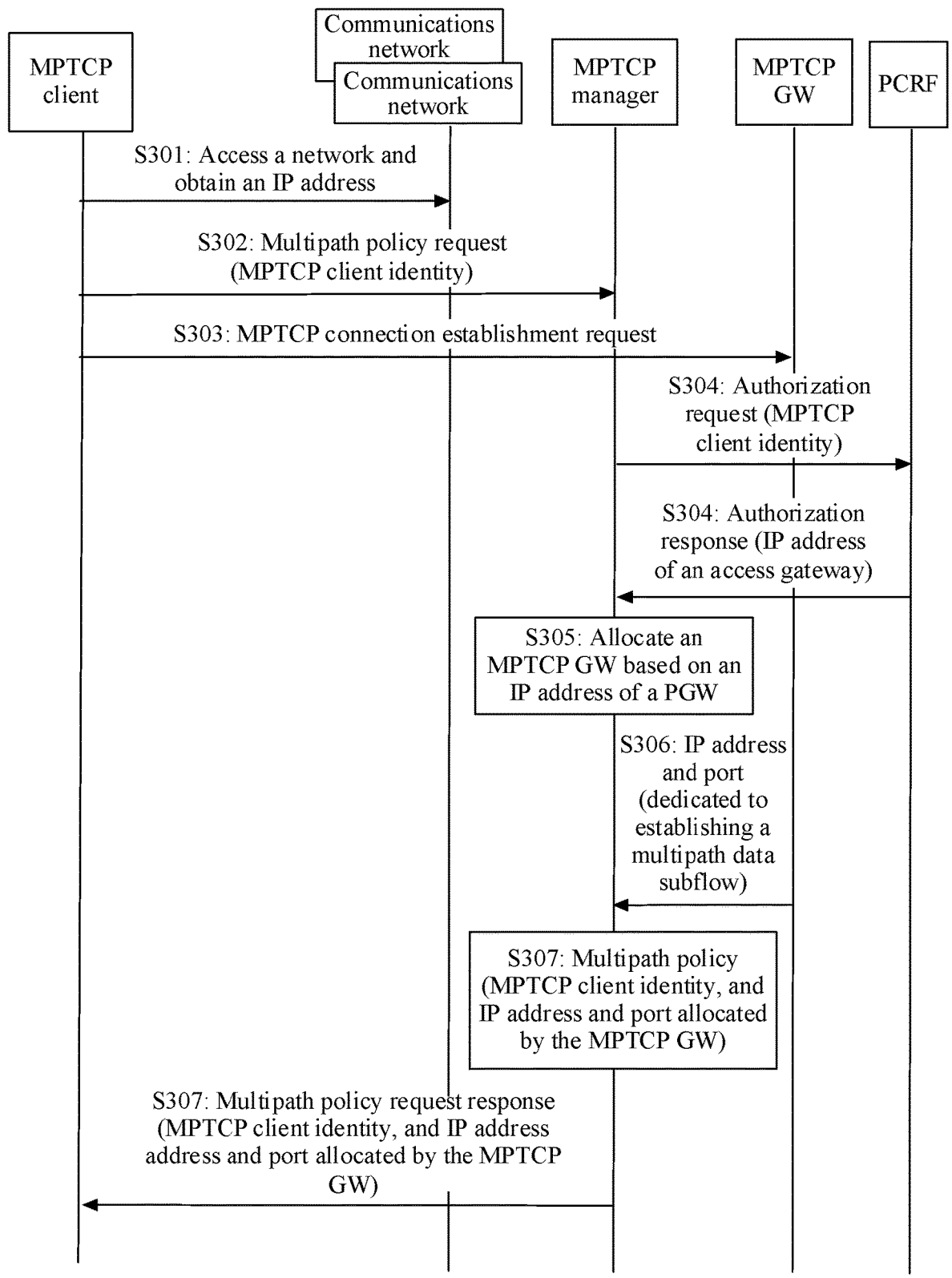
FIG. 8 is an implementation flowchart for an MPTCP GW to allocate an IP address and a port to an MPTCP client according to an embodiment of the present invention.

FIG. 8 is an implementation flowchart for an MPTCP GW to allocate a second IP address dedicated to establishing multipath data subflows to an MPTCP client according to an embodiment of the present invention. S301, S302, S303, S304, and S305 in FIG. 8 are identical to implementation processes of S201, S202, S203, S204, and S205, respectively. No more details are described herein. The following describes their differences only.

S306: The MPTCP GW allocates, to the MPTCP client, an IP address and a port number that are dedicated to establishing multipath data subflows, and sends the IP address and the port number to an MPTCP manager.

In this embodiment of the present invention, a multipath policy request sent by the MPTCP manager to the MPTCP GW allocated for an MPTCP service includes identification information of the MPTCP client and IP addresses of the MPTCP client in an LTE network and a Wi-Fi network.

The MPTCP GW allocates, to the MPTCP client, the IP address and the port number that are dedicated to establishing multipath data subflows, where the allocated IP address and port number dedicated to establishing multipath data subflows are in a correspondence with the identification information of the MPTCP client and the IP addresses of the MPTCP client in the LTE network and the Wi-Fi network, respectively.

S307: The MPTCP manager obtains information about the second IP address and the port (for example, the port number) that are dedicated to establishing multipath data subflows and that are allocated by the MPTCP GW to the MPTCP client, determines a multipath policy including an identity of the MPTCP client and the IP address and port number allocated by the MPTCP GW, and feeds back a multipath policy request response to the MPTCP client that can perform an MPTCP service.

In this embodiment of the present invention, the multipath policy request response sent by the MPTCP manager to the MPTCP client includes the information about the second IP address and the port that are dedicated to establishing multipath data subflows and that are allocated by the MPTCP GW to the MPTCP client, the identity of the MPTCP client, and a whitelist of MPTCP clients supporting multipath data transmission and services.

Figure 9:
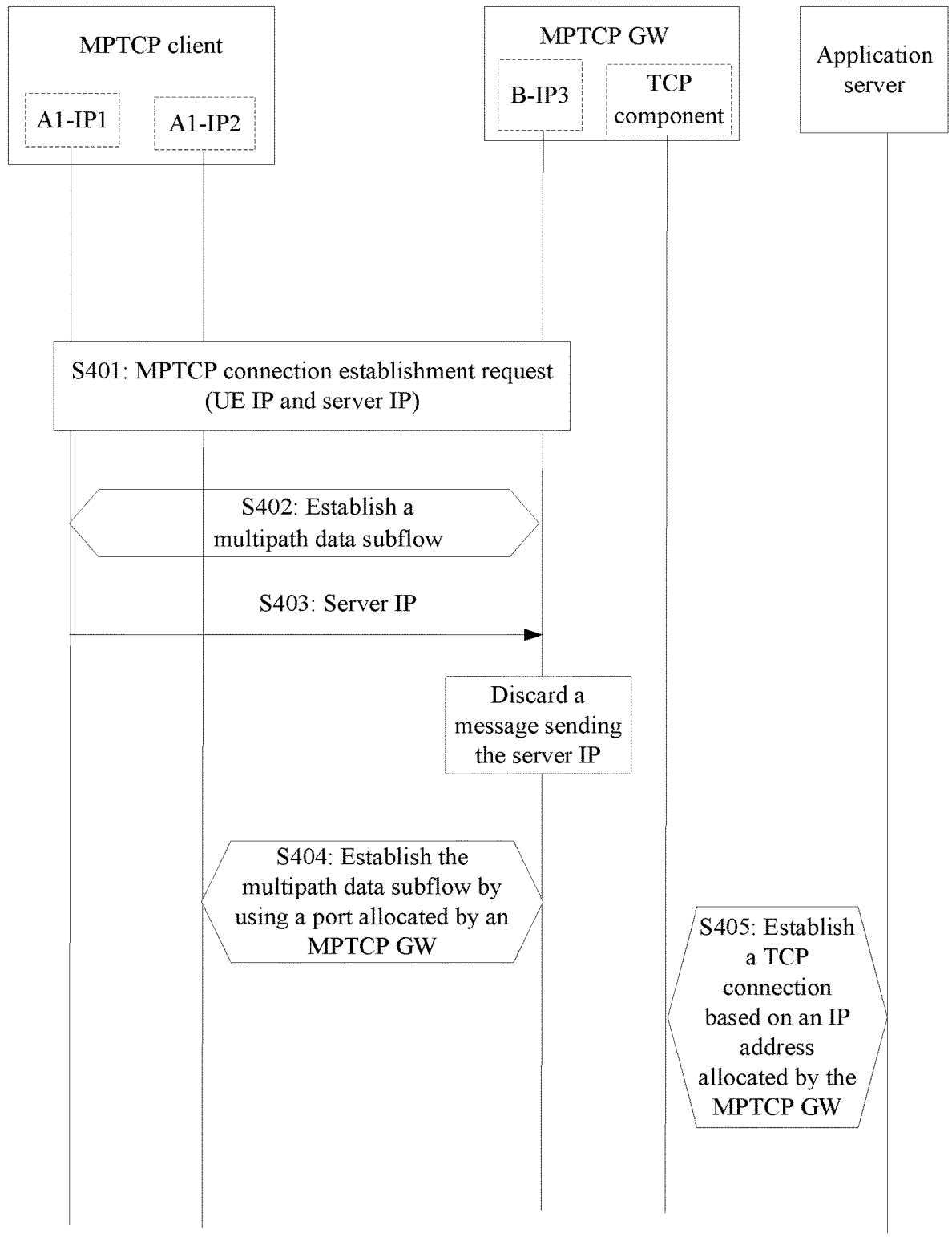
FIG. 9 is a schematic diagram of multipath data transmission in an LTE network and a Wi-Fi network according to an embodiment of the present invention.

FIG. 9 is an implementation flowchart for an MPTCP client to establish multipath data subflows to an MPTCP GW and perform MPTCP-based multipath data transmission.

In this embodiment of the present invention, various IP addresses in FIG. 9 and this embodiment are interpreted first.

UE IP: an IP allocated by a PGW to an MPTCP client accessing an LTE network.

IP1: an IP address of HostA1 in MPTCP-based multipath data transmission. A UE IP is used as IP1 in this solution.

IP2: an IP address of HostA2 in MPTCP-based multipath data transmission.

IP3: an IP address of HostB in an MPTCP GW in MPTCP-based multipath data transmission.

Server IP: an IP address of an application server to be accessed by an MPTCP client.

As shown in FIG. 9, an implementation procedure of establishing multipath data subflows and performing MPTCP-based multipath data transmission in this embodiment of the present invention includes the following steps.

S401: An MPTCP client sends an MPTCP connection establishment request.

In this embodiment of the present invention, a TCP connection establishment request initiated by the MPTCP client may be used to trigger the MPTCP client to send the MPTCP connection establishment request, where a source address of the TCP connection establishment request is UE IP, and a destination address is Server IP. The MPTCP client establishes a mapping relationship between UE IP (IP1) and IP3, and a mapping relationship between IP2 and IP3, and sends the MPTCP connection establishment request, to request to establish MPTCP multipath data subflows to the MPTCP GW.

S402: The MPTCP client establishes the first MPTCP multipath data subflow to the MPTCP GW.

HostA1 of the MPTCP client establishes the first MPTCP multipath data subflow, for example, a multipath data subflow in the LTE network, to HostB of the MPTCP GW. A source address of HostA1 is IP1, and an address of HostB of the MPTCP GW is IP3. A message exchange process for HostA1 of the MPTCP client to establish the first MPTCP multipath data subflow to HostB of the MPTCP GW is similar to conventional TCP handshaking, but differs from conventional TCP handshaking in that a multipath capability (MP_CAPABLE) option needs to be carried and a 64-bit key value needs to be exchanged.

Preferably, in this embodiment of the present invention, the MPTCP client may establish the multipath data subflow to the MPTCP GW by using the port that is allocated by the MPTCP GW to the MPTCP client and that is dedicated to establishing a multipath data subflow, so as to accelerate MPTCP-based data transmission.

It can be understood that in this embodiment of the present invention, if the MPTCP GW allocates, to the MPTCP client, the port dedicated to establishing a multipath data subflow, the option MP_CAPABLE needs to include information about the port that is dedicated to establishing a multipath data subflow and that is allocated by the MPTCP GW to the MPTCP client, so that the MPTCP client and the MPTCP GW establish a multipath data subflow in the LTE network by using the port that is dedicated to establishing a multipath data subflow and that is allocated by the MPTCP GW to the MPTCP client.

S403: The MPTCP client sends, to the MPTCP GW, an IP address Server IP address of an application server to be accessed by the MPTCP client.

After the first MPTCP multipath data subflow is established, the MPTCP client sends the Server IP to the MPTCP GW, so as to notify the MPTCP GW of the Server IP.

Optionally, in this embodiment of the present invention, the MPTCP client may send the Server IP by using a TCP message, where the TCP message is a TCP message sending the Server IP. For ease of description, the TCP message is referred to as an MPTCP message hereinafter. Information about the IP address and the port in the MPTCP message needs to be the same as the information about the IP address and the port in the MPTCP connection establishment request sent by the MPTCP client. Therefore, the MPTCP message may be alternatively an MPTCP connection establishment request. However, the MPTCP connection establishment request used for sending the Server IP is different from the MPTCP connection establishment request sent by the MPTCP client. In this embodiment of the present invention, the MPTCP message may be implemented by an extended private field, for example, an MPTCP_ADD option. The extended private field in this embodiment of the present invention is preferably a TCP message carrying an MPTCP option. For example, a field used to enable the MPTCP GW to identify the Server IP is added to the MPTCP connection establishment request sending the Server IP. After obtaining the MPTCP connection establishment request sending the Server IP, if the MPTCP GW determines that an IP address carried in the MPTCP connection establishment request is not in a local HostB address list, the MPTCP GW determines that the IP address carried in the MPTCP connection establishment request is the IP address of the application server to be accessed by the MPTCP client, and forwards, based on the IP address of the application server, the MPTCP connection establishment request to the application server to be accessed by the MPTCP client.

Optionally, after obtaining the Server IP, the MPTCP GW may send response information to the MPTCP client, so that the MPTCP client determines whether the MPTCP GW has received the Server IP. After obtaining the Server IP, the MPTCP GW may alternatively ignore the MPTCP message sending the Server IP, to simplify the message processing procedure. For example, if the MPTCP GW determines that the Server IP is sent in the MPTCP connection establishment request, the MPTCP GW ignores the MPTCP connection establishment request sending the Server IP.

S404: The MPTCP client establishes another multipath data subflow to the MPTCP GW.

HostA2 of the MPTCP client establishes an MPTCP multipath data subflow, for example, a multipath data subflow in the LTE network, to HostB of the MPTCP GW. A source address of HostA2 is IP2, and an address of HostB of the MPTCP GW is IP3. A message exchange process for HostA2 of the MPTCP client to establish the MPTCP multipath data subflow to HostB of the MPTCP GW is similar to conventional TCP handshaking, but differs from conventional TCP handshaking in that a multipath join (MP JOIN) option needs to be carried and a 32-bit random number (token) needs to be carried. The 32-bit token value is a hash value of the key carried in the established first multipath data subflow. This method enables verification for a newly established multipath data subflow and prevents a connection establishment attack on HostB.

S405: The MPTCP GW establishes a TCP connection to the application server to be accessed by the MPTCP client, and performs TCP-based data transmission.

In an implementation of this embodiment of the present invention, the MPTCP GW may establish the TCP connection to the application server to be accessed by the MPTCP client, by using the first IP address for the MPTCP client to establish a multipath data subflow and the IP address of the application server. In another implementation, the MPTCP GW may establish the TCP connection to the application server to be accessed by the MPTCP client, by using the IP address of the application server and the second IP address that is allocated by the MPTCP GW to the MPTCP client and that is in a correspondence with the first IP address.

In FIG. 9, an example in which the TCP connection is established based on the second IP address allocated by the MPTCP GW to the MPTCP client is used for description.

In the foregoing implementations, the MPTCP client may perform MPTCP-based multipath data transmission with the MPTCP GW, and the MPTCP GW performs TCP-based transmission with the application server.

It should be noted that in this embodiment of the present invention, timing of establishing the MPTCP multipath data subflows and the TCP connection is not limited. For example, in this embodiment of the present invention, the MPTCP multipath data subflows and the TCP connection may be established when it is determined that data transmission needs to be performed through the MPTCP multipath data subflows. Alternatively, in this embodiment of the present invention, the MPTCP multipath data subflows and the TCP connection may be established in advance, and when it is determined that data transmission needs to be performed through the MPTCP multipath data subflows, the pre-established MPTCP multipath data subflows and the TCP connection are used for data transmission. The pre-established MPTCP multipath data subflow may be an MPTCP long connection. The MPTCP long connection means that the MPTCP multipath data subflow remains in a connected state in at least two communications networks until the MPTCP client is offline in all of the at least two communications networks.

Optionally, in this embodiment of the present invention, if it is determined that no MPTCP-based multipath data transmission or TCP-based transmission is needed, a corresponding link resource may be released to save resources. For example, if the MPTCP GW determines that no data is transmitted in any of the at least two multipath data subflows within preset duration, or that the MPTCP client is already offline in the at least two networks, the MPTCP GW releases the at least two multipath data subflows and the TCP connection. If the MPTCP client determines that the MPTCP client is already offline in the at least two networks, or that no data is transmitted in any of the at least two multipath data subflows within preset duration, the MPTCP client releases the at least two multipath data subflows. In this embodiment of the present invention, that the MPTCP client is offline means that the MPTCP client has performed an operation such as detachment.

Optionally, in this embodiment of the present invention, the MPTCP manager may determine whether no data is transmitted in any of the at least two multipath data subflows. If the MPTCP manager determines that no data is transmitted in any of the at least two multipath data subflows within preset duration, or that the MPTCP client is already offline in the at least two networks, the MPTCP manager sends first indication information to the MPTCP GW and the MPTCP client, where the first indication information is used to indicate that no data is transmitted in any of the at least two multipath data subflows within preset duration, or that the MPTCP client is already offline in the at least two networks. After receiving the first indication information, the MPTCP GW and the MPTCP client release the at least two multipath data subflows and the TCP connection.

In this embodiment of the present invention, a notification message that no data is transmitted in the multipath data subflows within preset duration and that the MPTCP client is already offline in the at least two networks may be pushed by a network element in a communications network to the MPTCP manager. The network element pushing the notification message is a network element capable of determining whether the MPTCP client is offline, for example, a PGW or a PCRF in the LTE network. The PGW in the LTE network is preferred in this embodiment of the present invention.

In this embodiment of the present invention, the MPTCP manager may further query a data transmission status of each of the at least two multipath data subflows and whether the MPTCP client is offline. If the MPTCP manager finds that no data is transmitted in any of the at least two multipath data subflows within the preset duration, or that the MPTCP client is already offline in the at least two networks, a corresponding link resource may be released.

In this embodiment of the present invention, the MPTCP manager may query, according to a specified period, the data transmission status of each of the at least two multipath data subflows and whether the MPTCP client is offline. Alternatively, the MPTCP manager may query, after receiving a notification message that no data is transmitted in a specified quantity of multipath data subflows in the at least two multipath data subflows or that the MPTCP client is offline in a specified network, a data transmission status of a multipath data subflow not receiving the notification message or whether the MPTCP client is offline in another unspecified network. For example, after receiving the notification message that the MPTCP client is offline in the LTE network, the MPTCP manager queries whether the MPTCP client is offline in the Wi-Fi network. If the MPTCP manager determines that the MPTCP client is offline both in the LTE network and the Wi-Fi network, the MPTCP manager releases corresponding link resources.

In the multipath data transmission method provided in this embodiment of the present invention, the MPTCP client and the MPTCP GW provide a proxy service for TCP-based data transmission. In addition, TCP-based transmission between the MPTCP GW and the application server is implemented without using the IP address of the MPTCP GW, thereby improving security of the MPTCP GW. The application server can obtain the IP address information of the MPTCP client, which facilitates traffic statistics and control for the MPTCP client. In addition, using the multipath policy mechanism such as a blacklist/whitelist by the MPTCP manager helps implement splitting control and differentiated charging for a service.

It should be noted that in the specification, claims, and accompanying drawings of the embodiments of the present invention, the terms "first", "second", and so on are intended to distinguish between similar objects but do not necessarily indicate a specific order or sequence. For example, a first IP address and a second IP address in the embodiments of the present invention are only for ease of description and distinguishing between different IP addresses, and do not constitute a limitation on the IP addresses. It should be understood that the data termed in such a way are interchangeable in proper circumstances so that the embodiments of the present invention described herein can be implemented in other orders than the order illustrated or described herein.

The foregoing mainly describes the solutions provided in the embodiments of the present invention from the perspective of interaction between the multipath proxy gateway, the multipath proxy client, and the multipath management device. It can be understood that, to implement the foregoing functions, the multipath proxy gateway, the multipath proxy client, and the multipath management device all include a corresponding hardware structure and/or software module for performing each function. With reference to units and algorithm steps of each example described in the embodiments disclosed in the present invention, the embodiments of the present invention may be implemented in a form of hardware or a combination of hardware and computer software. Whether a function is performed by hardware or hardware driven by computer software depends on particular applications and design constraints of the technical solutions. A person skilled in the art may use different methods for each particular application to implement the described functions, but it should not be construed that the implementation goes beyond the scope of the technical solutions of the embodiments of the present invention.

In the embodiments of the present invention, functional units may be defined for the multipath proxy gateway, the multipath proxy client, and the multipath management device based on the foregoing method examples. For example, each functional unit may be defined in a correspondence to each function, or two or more functions may be integrated into one processing unit. The integrated unit may be implemented in a form of hardware, or may be implemented in a form of a software functional unit. It should be noted that the unit division in the embodiments of this application is an example and merely logical function division, and may be other division in actual implementation.

Figure 10:
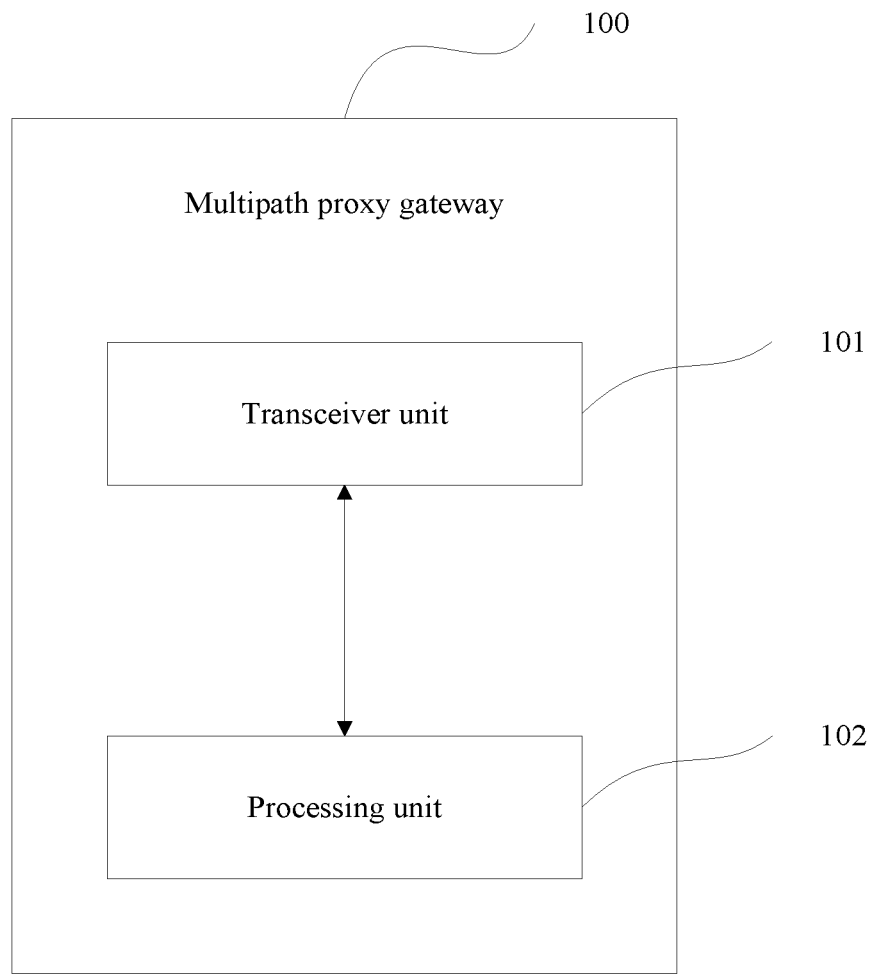
FIG. 10 is a schematic structural diagram of a multipath proxy client according to an embodiment of the present invention.

When an integrated unit is used, FIG. 10 is a schematic structural diagram of a multipath proxy gateway 100. The multipath proxy gateway 100 includes a transceiver unit 101 and a processing unit 102. The transceiver unit 101 is configured to obtain a first IP address of a multipath proxy client, where the first IP address is used for establishing at least two multipath data subflows between the multipath proxy gateway and the multipath proxy client. The processing unit 102 is configured to establish, based on the first IP address obtained by the transceiver unit 101, a TCP connection to an application server to be accessed by the multipath proxy client, and perform TCP-based data transmission through the TCP connection.

The processing unit 102 may allocate, based on the first IP address, a second IP address in a mapping relationship with the first IP address to the multipath proxy client, where the second IP address is used to indicate that multipath data transmission is to be performed; and establish, based on the second IP address, the TCP connection to the application server to be accessed by the multipath proxy client.

The transceiver unit 101 is further configured to: before the multipath proxy gateway establishes the TCP connection to the application server to be accessed by the multipath proxy client, obtain an IP address of the application server to be accessed by the multipath proxy client, where the IP address of the application server is sent by the multipath proxy client.

The processing unit 102 is further configured to: after the transceiver unit 101 obtains the IP address of the application server, ignore a TCP message used for sending the IP address of the application server.

The processing unit 102 is further configured to: after the transceiver unit 101 obtains the first IP address of the multipath proxy client, allocate, to the multipath proxy client based on the first IP address, a port dedicated to multipath data transmission; and establish, by using the port, at least two multipath data subflows to the multipath proxy client.

The processing unit 102 is further configured to: after the multipath proxy gateway establishes the TCP connection to the application server to be accessed by the multipath proxy client, if determining that no data is transmitted in any of the established at least two multipath data subflows within preset duration, or that the multipath proxy client is already offline in at least two networks in which the at least two multipath data subflows are established, release the established at least two multipath data subflows and the TCP connection.

The processing unit 102 is further configured to: before establishing, based on the first IP address, the TCP connection to the application server to be accessed by the multipath proxy client, determine that the multipath proxy client supports a multipath service.

The processing unit 102 may determine, based on indication information sent by a multipath management device to indicate that the multipath proxy gateway is allocated to the multipath proxy client for multipath data transmission, that the multipath proxy client supports a multipath service.

When a form of hardware is used for implementation, in this embodiment of the present invention, the processing unit 102 may be a processor or a controller. The transceiver unit 101 may be a communications interface, a transceiver, a transceiver circuit, or the like. The communications interface is a collective term and may include one or more interfaces.

Figure 11:
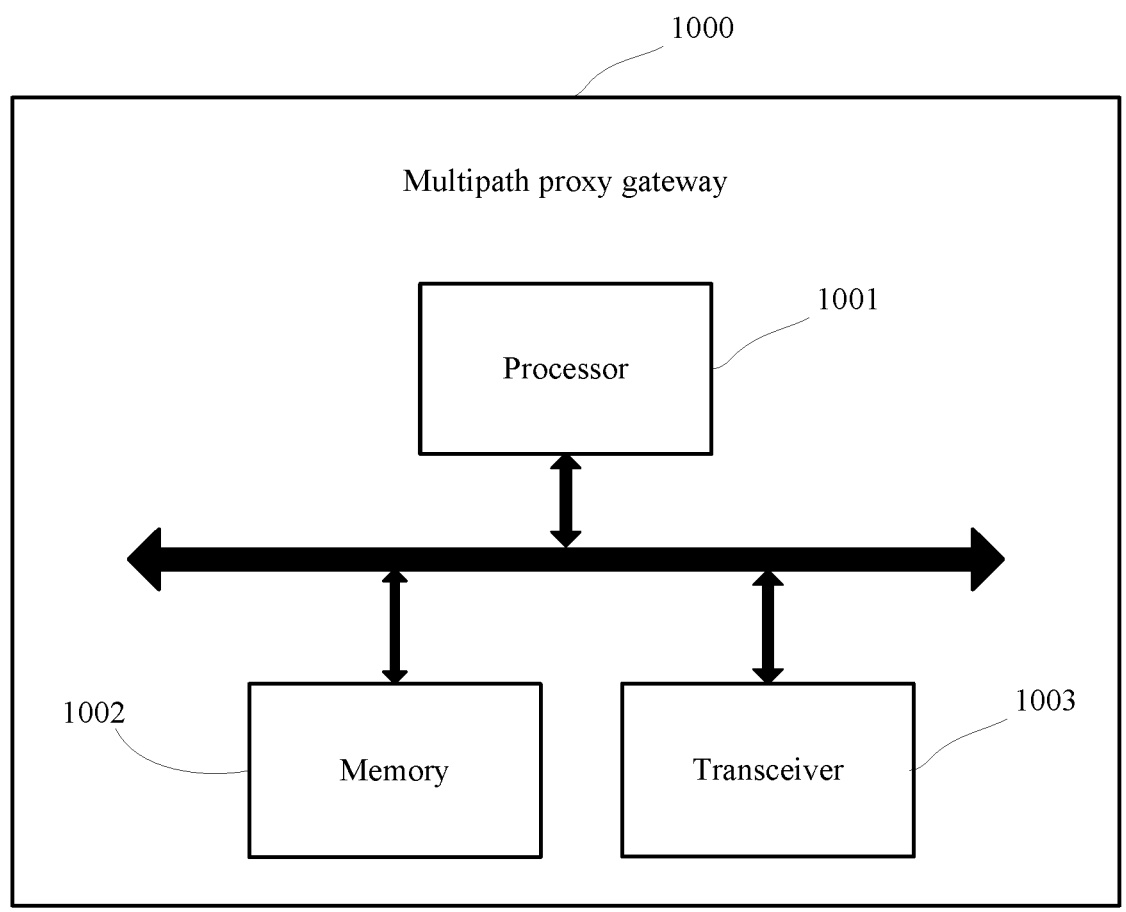
FIG. 11 is another schematic structural diagram of a multipath proxy client according to an embodiment of the present invention.

When the transceiver unit 101 is a transceiver and the processing unit 102 is a processor, the multipath proxy gateway 100 in this embodiment of the present invention may be a multipath proxy gateway 1000 shown in FIG. 11.

FIG. 11 is a schematic structural diagram of a multipath proxy gateway 1000 according to an embodiment of the present invention. As shown in FIG. 11, the multipath proxy gateway 1000 includes a processor 1001, a memory 1002, and a transceiver 1003. The memory 1002 is configured to store an instruction. The processor 1001 is configured to execute the instruction stored in the memory to control the transceiver 1003 to obtain a first IP address of a multipath proxy client, establish, based on the first IP address obtained by the transceiver 1003, a TCP connection to an application server to be accessed by the multipath proxy client, and perform TCP-based data transmission through the TCP connection.

In this embodiment of the present invention, for concepts, interpretations, detailed descriptions, and other steps of the multipath proxy gateway 100 and the multipath proxy gateway 1000 that are related to the technical solutions provided by the embodiments of the present invention, refer to descriptions of the content in the foregoing method or other embodiments. No more details are described herein.

Figure 12:
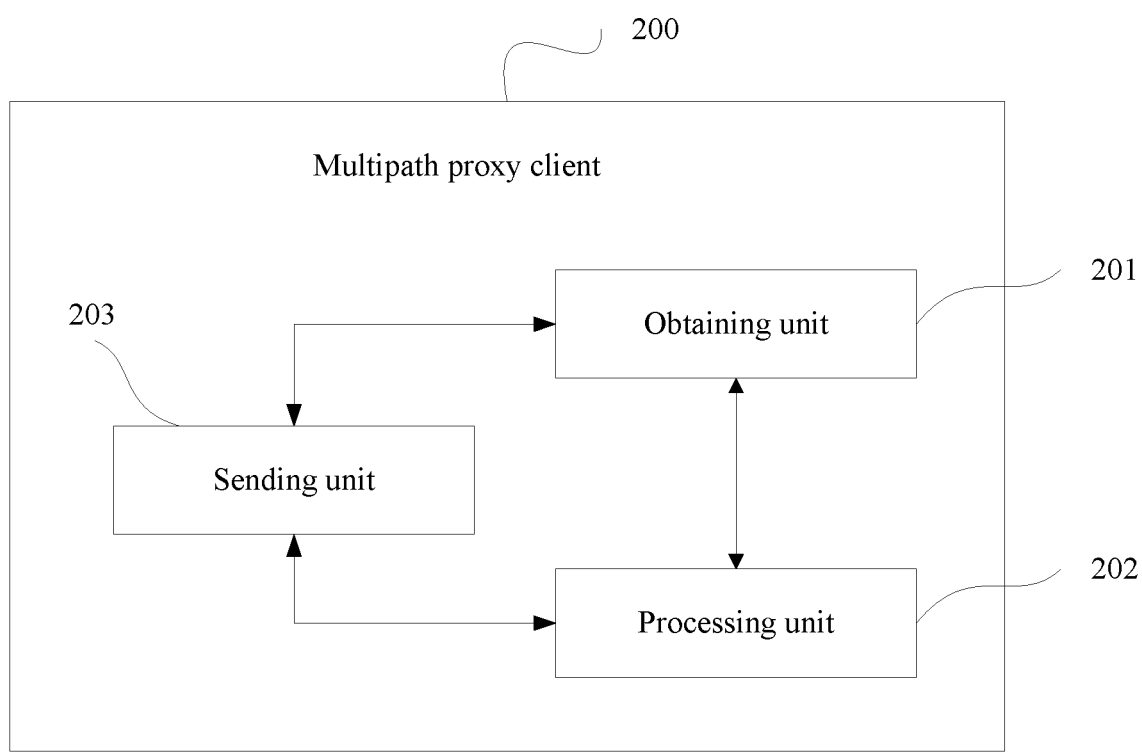
FIG. 12 is a schematic structural diagram of a multipath proxy gateway according to an embodiment of the present invention.

When an integrated unit is used, FIG. 12 is a schematic structural diagram of a multipath proxy client 200. As shown in FIG. 12, the multipath proxy client 200 includes an obtaining unit 201 and a processing unit 202. The obtaining unit 201 is configured to obtain an IP address of a multipath proxy gateway and determine a port dedicated to multipath data transmission, where the port is allocated by the multipath proxy gateway to the multipath proxy client based on a first internet protocol IP address of the multipath proxy client, and the first IP address is used for establishing at least two multipath data subflows between the multipath proxy client and the multipath proxy gateway. The processing unit 202 is configured to establish, by using the port determined by the obtaining unit 201 and based on the first IP address and the IP address of the multipath proxy gateway obtained by the obtaining unit 201, at least two multipath data subflows to the multipath proxy gateway, and perform data transmission through the multipath data subflows.

The multipath proxy client further includes a sending unit 203. The sending unit 203 is configured to send a multipath policy request to a multipath management device, where the multipath policy request includes identification information of the multipath proxy client. The obtaining unit 201 receives the IP address of the multipath proxy gateway allocated by the multipath management device to the multipath proxy client based on the identification information of the multipath proxy client.

The sending unit 203 is configured to: after the obtaining unit 201 obtains the IP address of the multipath proxy gateway, send an IP address of an application server to be accessed by the multipath proxy client to the multipath proxy gateway.

The processing unit 202 is further configured to: after the multipath proxy client establishes the at least two multipath data subflows to the multipath proxy gateway, if determining that no data is transmitted in any of the established at least two multipath data subflows within preset duration, or that the multipath proxy client is already offline in at least two networks in which the at least two multipath data subflows are established, release the established at least two multipath data subflows.

The processing unit 202 is further configured to: before the multipath proxy client establishes the at least two multipath data subflows to the multipath proxy gateway, determine that the multipath proxy client supports a multipath service.

When a form of hardware is used for implementation, in this embodiment of the present invention, the processing unit 202 may be a processor or a controller; the receiving unit 201 may be a receiver, or the like; and the sending unit 203 may be a transmitter, or the like.

Figure 13:
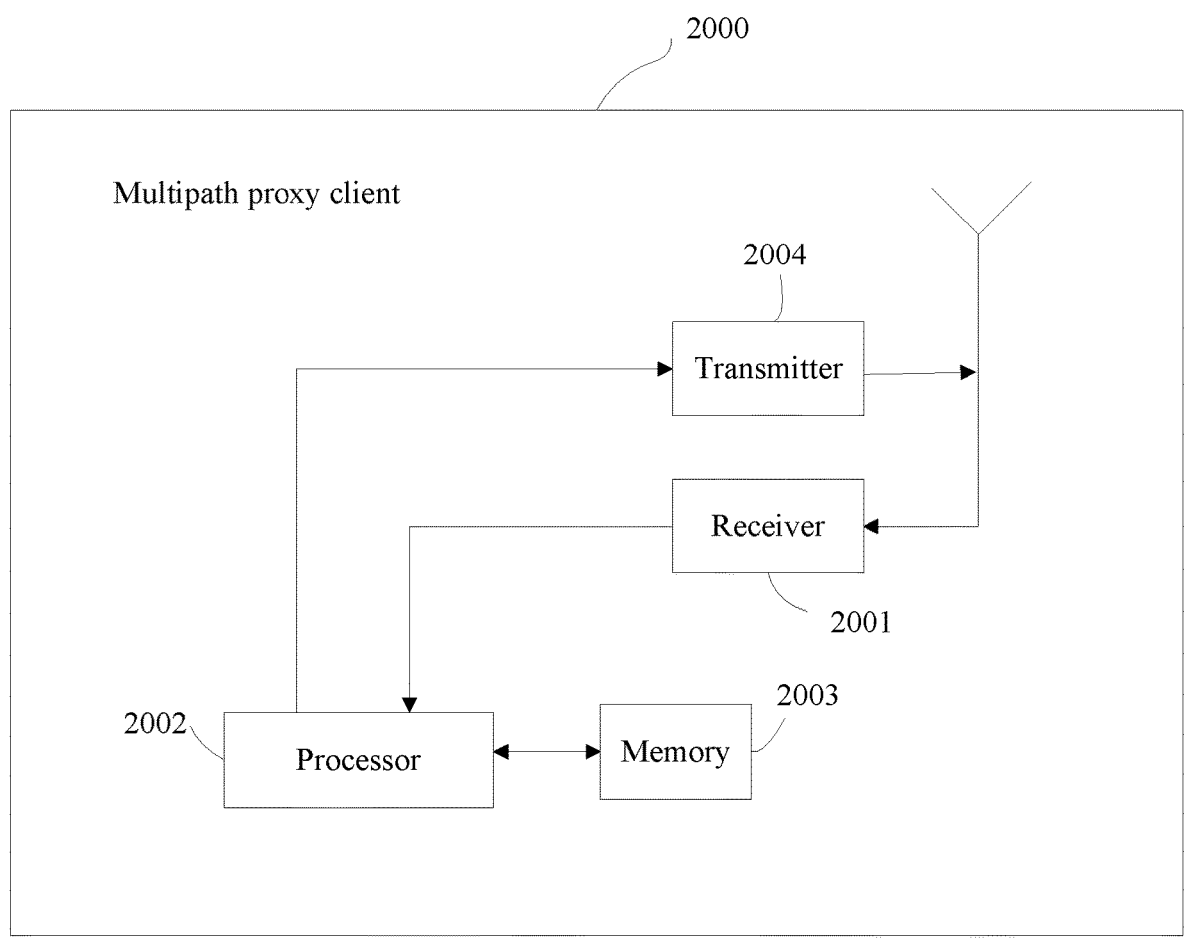
FIG. 13 is another schematic structural diagram of a multipath proxy gateway according to an embodiment of the present invention.

When the processing unit 202 is a processor, the receiving unit 201 is a receiver, and the sending unit 203 is a transmitter, the multipath proxy client 200 in this embodiment of the present invention may be a structure shown in FIG. 13.

FIG. 13 is a schematic structural diagram of a multipath proxy client 2000 according to an embodiment of the present invention. The multipath proxy client 2000 may be a terminal. As shown in FIG. 13, the multipath proxy client 2000 includes a receiver 2001 and a processor 2002. The receiver 2001 is configured to support the multipath proxy client in obtaining an IP address of a multipath proxy gateway and determining a port dedicated to multipath data transmission. The processor 2002 is configured to support the multipath proxy client in performing functions of the multipath proxy client in the foregoing method embodiments. The multipath proxy client may further include a memory 2003 and a transmitter 2004. The memory 2003 is configured to couple to the processor 2001, and store program instructions and data necessary for the multipath proxy client. The transmitter 2004 is configured to send an IP address of an application server to be accessed by the multipath proxy client to the multipath proxy gateway.

In this embodiment of the present invention, for concepts, interpretations, detailed descriptions, and other steps of the multipath proxy client 200 and the multipath proxy client 2000 that are related to the technical solutions provided by the embodiments of the present invention, refer to descriptions of the content in the foregoing method or other embodiments. No more details are described herein.

Figure 14:
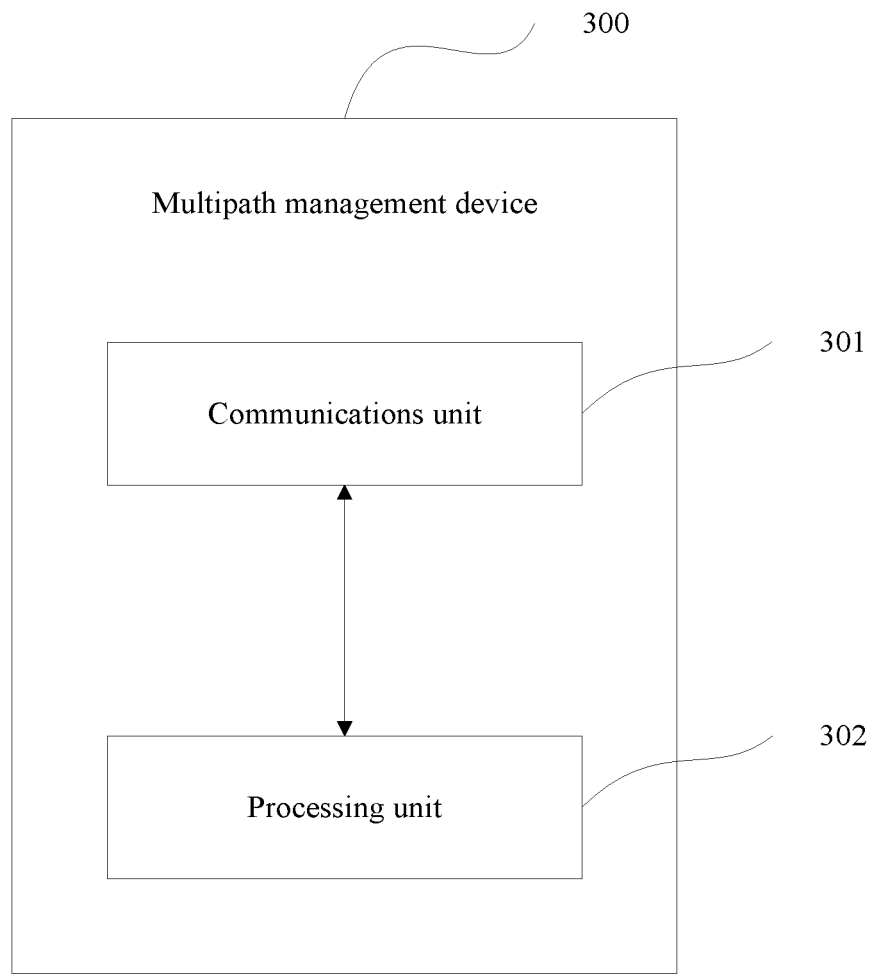
FIG. 14 is a schematic structural diagram of a multipath management device according to an embodiment of the present invention.

When an integrated unit is used, FIG. 14 is a schematic structural diagram of a multipath management device 300. As shown in FIG. 14, the multipath management device 300 includes a communications unit 301 and a processing unit 302. The communications unit 301 is configured to obtain a multipath policy request sent by a multipath proxy client, where the multipath policy request includes identification information of the multipath proxy client. The processing unit 302 is configured to determine, based on the identification information of the multipath proxy client, that the multipath proxy client supports a multipath service, and allocate a multipath proxy gateway to the multipath proxy client.

The processing unit 302 may determine, based on the identification information of the multipath proxy client, access gateways accessed by the multipath proxy client in at least two different networks; and allocate, based on a correspondence between an access gateway and a multipath proxy gateway or based on an IP address of a multipath proxy gateway sent by the access gateway, a multipath proxy gateway in each of the at least two different networks to the multipath proxy client.

The communications unit 301 is further configured to: after obtaining the multipath policy request sent by the multipath proxy client, obtain information about a second IP address and a port that are allocated by the multipath proxy gateway to the multipath proxy client and that are dedicated to establishing a multipath data subflow, and send, to the multipath proxy client, the obtained information about the second IP address and the port that are dedicated to establishing a multipath data subflow.

The processing unit 302 is further configured to: after allocating the multipath proxy gateway to the multipath proxy client, if determining that no data is transmitted in any of the established at least two multipath data subflows within preset duration, or that the multipath proxy client is already offline in at least two networks in which the at least two multipath data subflows are established, send first indication information to the multipath proxy client and the multipath proxy gateway, where the first indication information is used to indicate that no data is transmitted in any of the established at least two multipath data subflows within the preset duration, or that the multipath proxy client is already offline in the at least two networks in which the at least two multipath data subflows are established.

When a form of hardware is used for implementation, in this embodiment of the present invention, the processing unit 302 may be a processor or a controller. The communications unit 301 may be a communications interface, a transceiver, a transceiver circuit, or the like. The communications interface is a collective term and may include one or more interfaces.

Figure 15:
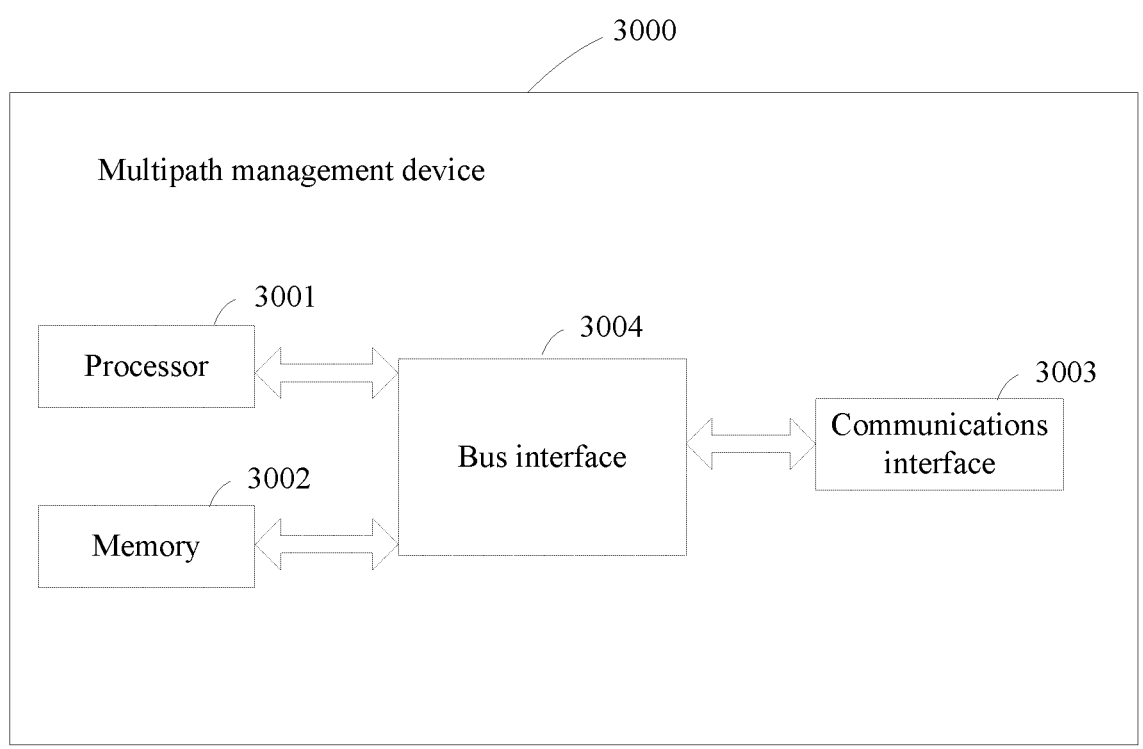
FIG. 15 is another schematic structural diagram of a multipath management device according to an embodiment of the present invention.

When the communications unit 301 is a communications interface and the processing unit 302 is a processor, the multipath management device 300 in this embodiment of the present invention may be a multipath management device 3000 shown in FIG. 15.

FIG. 15 is a schematic structural diagram of a multipath management device 3000 according to an embodiment of the present invention. As shown in FIG. 15, the multipath management device 3000 includes a processor 3001, a memory 3002, and a communications interface 3003. The memory 3002 is configured to store an instruction. The processor 3001 is configured to execute the instruction stored in the memory 3002 to support the functions of the multipath management device in the foregoing method embodiments. The communications interface 3003 is configured to, under control of the processor 3001, support the multipath management device in communicating with other network elements such as a multipath proxy gateway and a multipath proxy client.

It can be understood that accompanying figures in the embodiments of the present invention show only a simplified design of the multipath proxy gateway, a multipath client, and the multipath management device. In actual application, the multipath proxy gateway, the multipath client, and the multipath management device are not limited to the foregoing structures. For example, a terminal acting as the multipath proxy client may further include a display device, an input/output interface, and the like. All terminals that can implement the embodiments of the present invention fall within the protection scope of the embodiments of the present invention. The multipath proxy gateway and the multipath management device may further include any quantity of transmitters, receivers, processors, controllers, memories, communications units, and the like. All network devices that can implement the embodiments of the present invention fall within the protection scope of the embodiments of the present invention.

Further, the processor, the memory, the communications interface, and the transceiver may be connected by using a bus. A bus architecture may include any quantity of interconnected buses and bridges that are specifically connected by using various circuits of one or more processors represented by the processor and a memory represented by the memory. The bus architecture may further connect various other circuits such as a peripheral device, a voltage stabilizer, and a power management circuit. These are well known in the art, and therefore are not further described in this specification. In the accompanying figures in this specification, the multipath management device shown in FIG. 15 including a bus interface 3004 providing an interface is used as an example for description. The processor is responsible for bus architecture management and general processing. The memory may store data that is used by the processor when the processor performs an operation.

It should be noted that the processor in the embodiments of the present invention may be a central processing unit (CPU), a general-purpose processor, a digital signal processor (DSP), an application-specific integrated circuit (ASIC), a field programmable gate array (FPGA), or another programmable logic device, a transistor logic device, a hardware component, or a combination thereof. The processor may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor.

The memory may be integrated into the processor, or may be separate from the processor.

In an implementation, functions of the receiver and the transmitter may be implemented by using a transceiver circuit or a dedicated transceiver chip. The processor may be implemented by using a dedicated processing chip, a processing circuit, a processor, or a general-purpose chip.

In another implementation, program code that implements functions of the processor, the receiver, and the transmitter is stored in the memory, and the general-purpose processor executes the code in the memory to implement the functions of the processor, the receiver, and the transmitter.

According to the method provided in the embodiments of the present invention, an embodiment of the present invention further provides a communications system, including one or more foregoing multipath proxy gateways, a multipath client, and a multipath management device.

An embodiment of the present invention further provides a computer storage medium configured to store some instructions. When these instructions are executed, any method of the multipath proxy gateway, the multipath client, or the multipath management device may be implemented.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A multipath data transmission method comprising:
   sending, by a multipath management device, indication information to a multipath proxy gateway to indicate that the multipath proxy gateway is allocated to a multipath proxy client for multipath data transmission;
   obtaining, by the multipath proxy gateway, a first internet protocol (IP) address of the multipath proxy client;
   establishing, by the multipath proxy gateway, at least two multipath data subflows between the multipath proxy gateway and the multipath proxy client; and
   establishing, by the multipath proxy gateway based on the first IP address, a transmission control protocol (TCP) connection to an application server to be accessed by the multipath proxy client, and performing TCP-based data transmission through the TCP connection.

2. The method according to claim 1, wherein establishing the TCP connection to the application server comprises:
   allocating, by the multipath proxy gateway based on the first IP address, a second IP address in a mapping relationship with the first IP address to the multipath proxy client, wherein the second IP address indicates that multipath data transmission is to be performed; and
   establishing, by the multipath proxy gateway based on the second IP address, the TCP connection to the application server to be accessed by the multipath proxy client.

3. The method according to claim 1, wherein before establishing the TCP connection to the application server, the method further comprises:
   obtaining, by the multipath proxy gateway, an IP address of the application server to be accessed by the multipath proxy client, wherein the IP address of the application server is sent by the multipath proxy client.

4. The method according to claim 1, wherein after obtaining the first IP address of the multipath proxy client, the method further comprises:
   allocating, by the multipath proxy gateway to the multipath proxy client based on the first IP address, a port dedicated to multipath data transmission; and
   establishing, by the multipath proxy gateway by using the port, at least two multipath data subflows to the multipath proxy client.

5. The method according to claim 1, wherein after establishing the TCP connection to the application server, the method further comprises:
   releasing, by the multipath proxy gateway, the established at least two multipath data subflows and the TCP connection in response to the multipath proxy gateway determining that no data is transmitted in any of the established at least two multipath data subflows within preset duration, or that the multipath proxy client is already offline in at least two networks in which the at least two multipath data subflows are established.

6. The method according to claim 1, further comprising:
   obtaining, by the multipath management device, a multipath policy request sent by the multipath proxy client;
   determining, by the multipath management device based on the multipath policy request, that the multipath proxy client supports a multipath service; and
   allocating, by the multipath management device, the multipath proxy gateway to the multipath proxy client.

7. A multipath data transmission method comprising:
   receiving, by a multipath management device, a multipath policy request sent by a multipath proxy client;
   determining, by the multipath management device based on the multipath policy request of the multipath proxy client, that the multipath proxy client supports a multipath service;
   allocating, by the multipath management device, a multipath proxy gateway to the multipath proxy client; and
   sending, by the multipath management device, indication information to the multipath proxy gateway to indicate that the multipath proxy gateway is allocated to the multipath proxy client for multipath data transmission.

8. The method according to claim 7, wherein after allocating the multipath proxy gateway to the multipath proxy client, the method further comprises:
   in response to the multipath management device determining that no data is transmitted in any of the established at least two multipath data subflows within preset duration, or that the multipath proxy client is already offline in at least two networks in which the at least two multipath data subflows are established,
   sending, by the multipath management device, first indication information to the multipath proxy client and the multipath proxy gateway,
   wherein the first indication information indicates that no data is transmitted in any of the established at least two multipath data subflows within the preset duration, or that the multipath proxy client is already offline in the at least two networks in which the at least two multipath data subflows are established.

9. The method according to claim 7, further comprising:
   sending, by the multipath management device, a multipath policy request response to the multipath proxy client.

10. The method according to claim 9, wherein the multipath policy response includes an identification of the multipath proxy client.

11. The method according to claim 10, wherein the multipath policy response includes an IP address allocated for the multipath proxy client by the multipath proxy gateway.

12. A multipath proxy gateway comprising:
a processor, a memory, and a transceiver;
wherein the memory is configured to store one or more instructions, and the processor is configured to execute the instruction stored in the memory to control the transceiver to perform signal receiving and sending;
when the processor executes the instruction stored in the memory, the multipath proxy gateway is configured to implement the following operations:
receiving indication information from a multipath management device to indicate that the multipath proxy gateway is allocated to a multipath proxy client for multipath data transmission;
obtaining a first internet protocol (IP) address of the multipath proxy client;
establishing at least two multipath data subflows between the multipath proxy gateway and the multipath proxy client;
establishing a transmission control protocol (TCP) connection to an application server to be accessed by the multipath proxy client based on the first IP address; and
performing TCP-based data transmission through the TCP connection.

13. The multipath proxy gateway according to claim 12, wherein the multipath proxy gateway is configured to:
allocate a second IP address in a mapping relationship with the first IP address to the multipath proxy client based on the first IP address, wherein the second IP address indicates that multipath data transmission is to be performed; and
establish the TCP connection to the application server to be accessed by the multipath proxy client based on the second IP address.

14. The multipath proxy gateway according to claim 12, wherein the multipath proxy gateway is configured to:
obtain an IP address of the application server to be accessed by the multipath proxy client, wherein the IP address of the application server is sent by the multipath proxy client.

15. The multipath proxy gateway according to claim 12, wherein the multipath proxy gateway is configured to:
allocate a port dedicated to multipath data transmission to the multipath proxy client based on the first IP address; and
establish at least two multipath data subflows to the multipath proxy client by using the port.

16. The multipath proxy gateway according to claim 12, wherein the multipath proxy gateway is configured to:
release the established at least two multipath data subflows and the TCP connection in response to the multipath proxy gateway determining that no data is transmitted in any of the established at least two multipath data subflows within preset duration, or that the multipath proxy client is already offline in at least two networks in which the at least two multipath data subflows are established.

17. A multipath data transmission method comprising:
sending, by a multipath proxy client, a multipath policy request to a multipath management device;
receiving, by the multipath proxy client, a multipath policy response from the multipath management device,
wherein the multipath policy response includes an IP address of a multipath proxy gateway allocated by the multipath management device;
establishing, by the multipath proxy client, multiple multipath data sub-flows to the multipath proxy gateway based on an IP address of the multipath proxy client in a first network, an IP address of the multipath proxy client in a second network and the IP address of the multipath proxy gateway; and
performing, by the multipath proxy client, data transmission to the multipath proxy gateway through the established multiple multipath data sub-flows.

18. The method according to claim 17, wherein the multipath policy response includes an identification of the multipath proxy client.

19. The method according to claim 17, wherein the multipath policy response includes an IP address allocated for the multipath proxy client by the multipath proxy gateway.

* * * * *

UNITED STATES PATENT AND TRADEMARK OFFICE
CERTIFICATE OF CORRECTION

| | | |
|---|---|---|
| PATENT NO. | : 11,140,071 B2 | Page 1 of 1 |
| APPLICATION NO. | : 16/482657 | |
| DATED | : October 5, 2021 | |
| INVENTOR(S) | : Wang et al. | |

It is certified that error appears in the above-identified patent and that said Letters Patent is hereby corrected as shown below:

On the Title Page

Page 2, Foreign Patent Documents, Citation 9: "WO 2012049631 A1 5/2013" should read -- WO 2012049631 A1 4/2012 --.

Signed and Sealed this
Ninth Day of August, 2022

Katherine Kelly Vidal
*Director of the United States Patent and Trademark Office*